United States Patent [19]

Sakaue et al.

[11] Patent Number: 5,414,703
[45] Date of Patent: May 9, 1995

[54] ASYNCHRONOUS CELL SWITCH

[75] Inventors: Kenji Sakaue, Yokohama; Yasuro Shobatake, Kawasaki; Masahiko Motoyama, Yokohama; Yoshinari Kumaki, Urayasu, all of Japan

[73] Assignee: Kabushiki Kaisha Toshiba, Kawasaki, Japan

[21] Appl. No.: 169,553

[22] Filed: Dec. 20, 1993

Related U.S. Application Data

[63] Continuation of Ser. No. 772,095, Oct. 7, 1991, abandoned.

[30] Foreign Application Priority Data

Oct. 8, 1990 [JP] Japan .................. 2-268549

[51] Int. Cl.$^6$ ............................... H04J 3/14
[52] U.S. Cl. ........................ 370/60; 370/61; 370/100.1
[58] Field of Search ........... 370/60, 60.1, 58.1, 370/94.1, 94.2, 94.3, 61, 58.2, 58.3, 84, 68, 100.1

[56] References Cited

U.S. PATENT DOCUMENTS

| | | | |
|---|---|---|---|
| 4,535,446 | 8/1985 | Mountain | 370/68 |
| 4,813,037 | 3/1989 | Debuysscher et al. | 370/60 |
| 4,823,340 | 4/1989 | Grassmann | 370/60 |
| 4,862,454 | 8/1989 | Dias et al. | 370/94.1 |
| 4,885,740 | 12/1989 | Person | 370/60 |
| 5,091,905 | 2/1992 | Amada | 370/94.1 |
| 5,099,475 | 3/1992 | Kozaki | 370/60 |
| 5,101,404 | 3/1992 | Kunimoto | 370/60 |

FOREIGN PATENT DOCUMENTS

| | | |
|---|---|---|
| 0268259(A2) | 5/1988 | European Pat. Off. . |
| 0336373(A2) | 10/1989 | European Pat. Off. . |
| 63-64056 | 3/1988 | Japan . |
| 3-3447 | 1/1991 | Japan . |

OTHER PUBLICATIONS

International Switching Symposium 1990, Kato et al, vol. III, pp. 27-32, "A VLSIC for the ATM Switching System".

Shobatake, et al., "Comparison Study of the ATM Switch Architecute", Electronic Information Communication Society Research Report, Information Network Study Meeting IN88-119, pp. 13-17, 1989.

*Primary Examiner*—Douglas W. Olms
*Assistant Examiner*—Chau T. Nguyen
*Attorney, Agent, or Firm*—Foley & Lardner

[57] ABSTRACT

A unit cell switch includes a plurality of input communication routes and output communication routes for transferring data cells therebetween, a plurality of first conversion devices for converting each cell given from these input communication routes into a desired form, a plurality of second conversion devices for converting each data given from the first conversion devices into a suitable form and transferring the resultant data to one of these output communication routes. Cell storing devices respectively receive and temporarily store cells transferred from corresponding first conversion devices based on address information given to the cells. A control device holds and controls route and address information on cells to be stored in the cell storing devices as unitary data, and decides a write address of each cell storing device to which a cell is given from the corresponding first cell conversion device and a read address of each cell storing device from which a cell is outputted to a cell switch device based on the route and address information. A cell switch device introduces cells to desired second cell conversion devices from corresponding cell storing devices under control of the transfer control device.

8 Claims, 13 Drawing Sheets

(8-INPUT-8 OUTPUT ATM SWITCH)

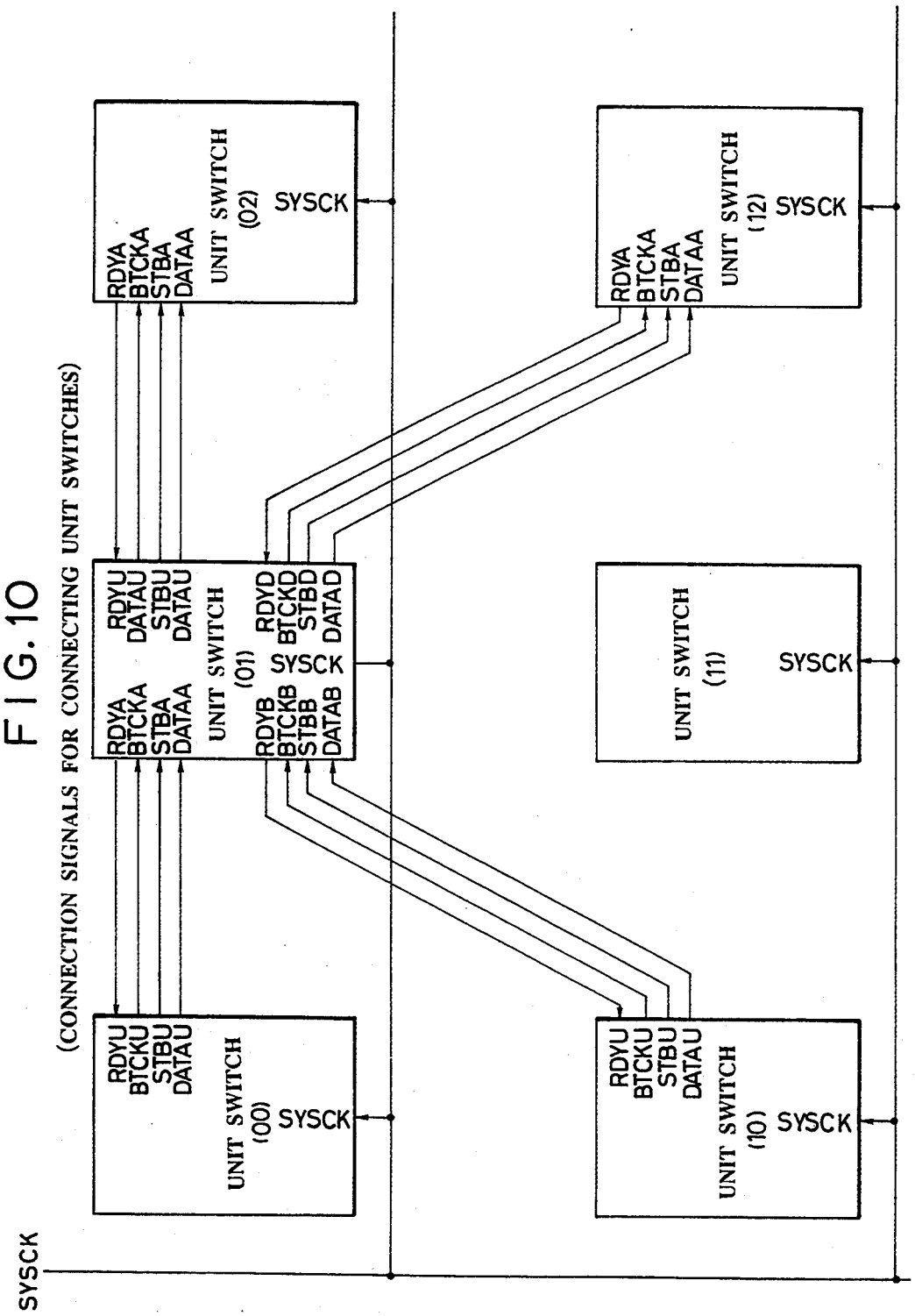

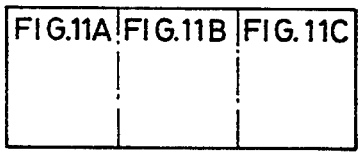
FIG. 11A
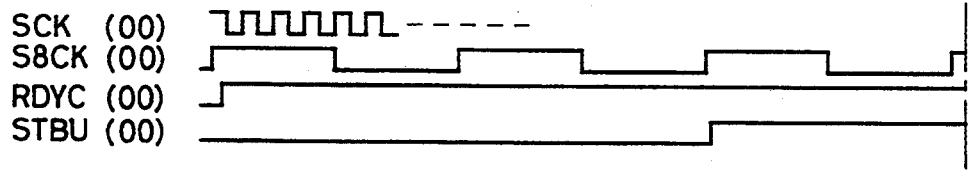
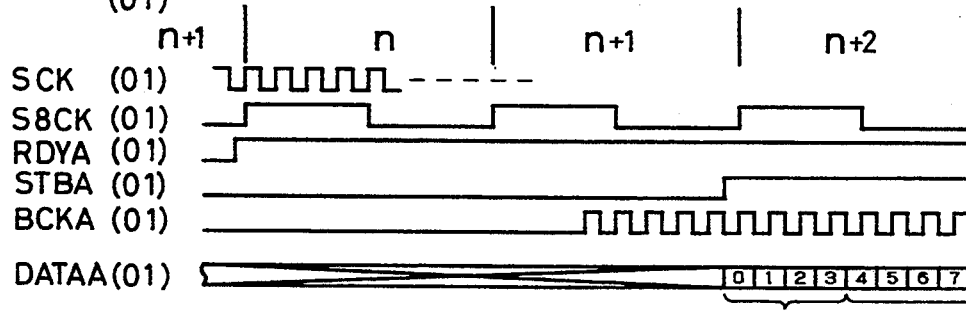
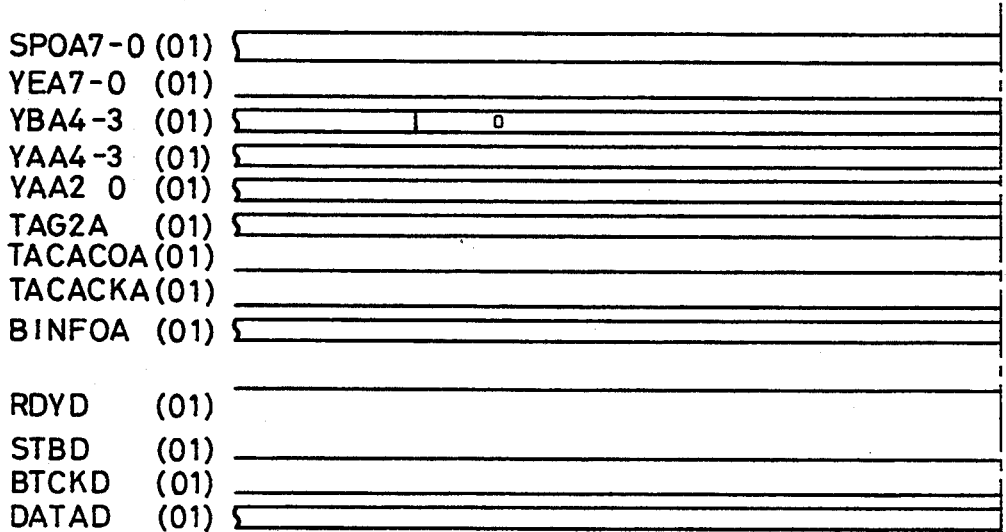
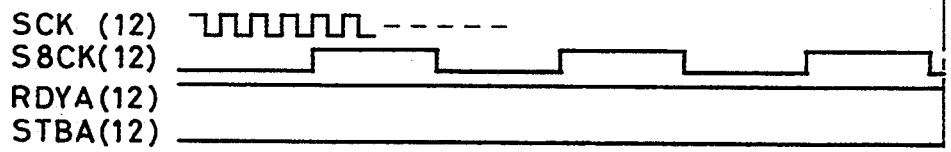

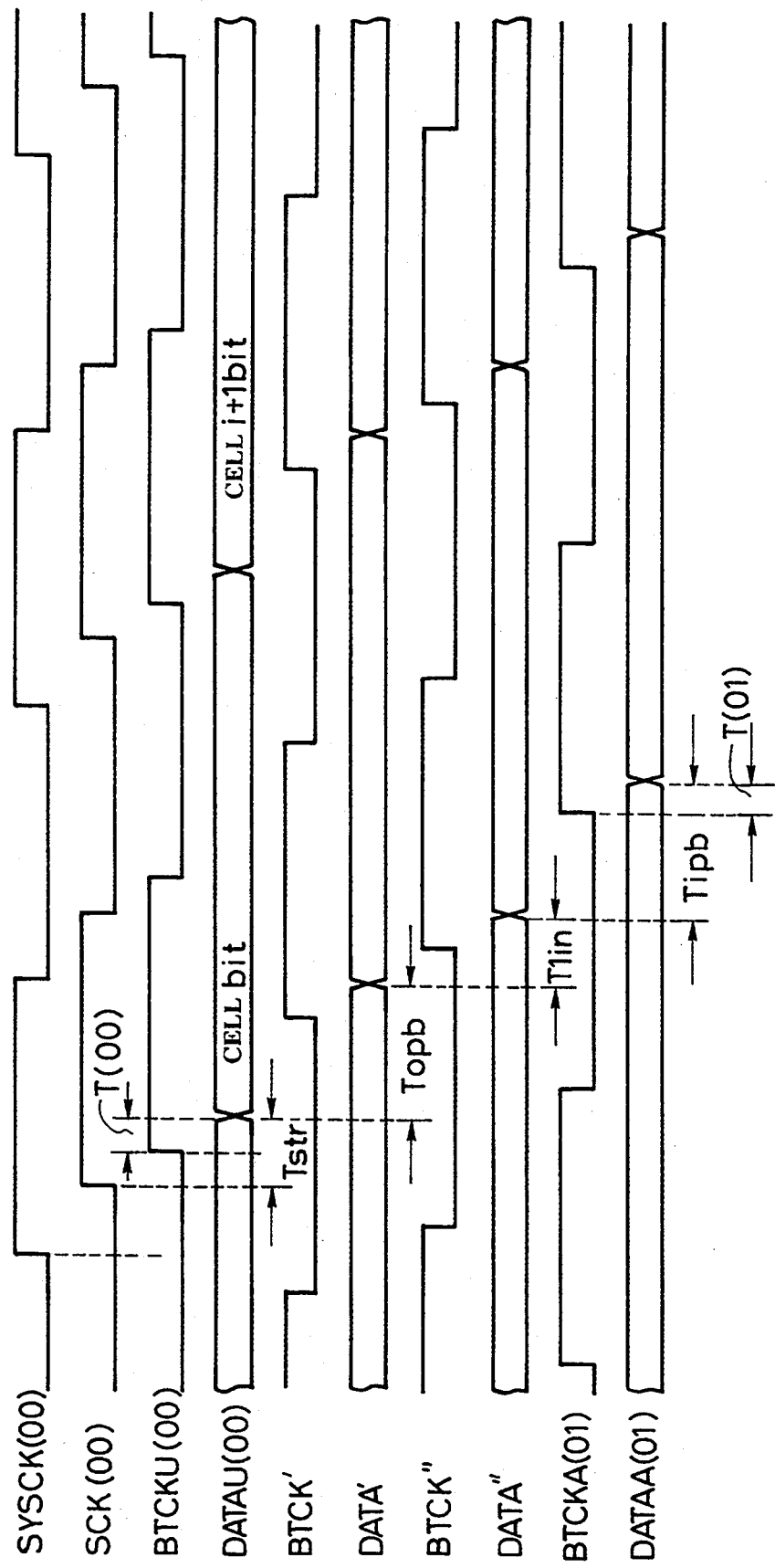

ASYNCHRONOUS CELL SWITCH

This application is a continuation of application Ser. No. 07/772,095, filed Oct. 7, 1991 now abandoned.

BACKGROUND OF THE INVENTION

1. Field of the Invention

The present invention relates to a cell switch which is used in ATM communication systems, and particularly to a cell switch which can be operated efficiently in nonsynchronous routing networks.

2. Description of the Prior Art

As a conventional information transfer mode used in telephone networks, there is a so-called asynchronous transfer mode (ATM) in which the information transfer function of the communication network can be optionally used by communication terminals. According to the ATM, each information is transferred as a short packet with a fixed length called a cell, and each communication terminal can optionally transfer the cell to the communication network, that is, each communication terminal can optionally use the information transfer function of the network.

To construct the ATM communication network, it is necessary to realize a function or a cell switch system for outputting cells to be transferred from a plurality of input communication routes to desired communication routes respectively. In this case, since the information transfer function of the communication network is used by a plurality of communication terminals, a so-called blocking state in which a plurality of cells are given to the same output communication route at the same time is generated. However, such blocking is usually avoided by transferring one of the plurality of cells to the output communication route and storing the other cells temporarily in a buffer.

As the method of avoiding the blocking, various methods are now studied. Particularly, since the blocking avoiding method depends much on the switching ability, it is desired to develop a cell switch system which can effectively avoid the blocking.

Among cell switch systems having been proposed so far, the cell switch system based on the so-called dispersion-collision avoiding input buffer method reported by the inventors, "Comparison Study of The ATM Switch Architecture" (Electronic Information Communication Society Research Report. Information Network Study Meeting IN88-119, pp13-17, 1989) is characterized in that a buffer is three-dimensionally assigned to a position from which the blocking is generated so as to avoid the blocking. This cell switch system generally comprises a switch network known as a multi-stage self routing network with buffers. In more detail, the multi-stage routing network with buffers means a switch network where a buffer is provided in each 2-input-2-output unit switch (hereinafter simply called unit switch) so as to avoid the blocking. Moreover, as is well known, the multi-stage self routing network is constructed by connecting a plurality of unit switches, and it can introduce cells inputted from input communication routes to desired output communication routes, respectively, by switching the transfer route of each cell in accordance with a bit value corresponding to a predetermined position of the cell.

In the conventional cell switch system based on this multi-stage self routing network with buffers, all of the unit switches of the network are operated in synchronism with one another (hereinafter, this system is called a synchronous-type system). However, in such a synchronous-type system, the time required for transferring 1 bit of each cell between unit switches (hereinafter called switch-to-switch cell transfer delay time) determines the maximum frequency Ftrns of a clock signal for transferring the cell. FIGS. 1 and 2 are a diagram and a timing chart to explain the switch-to-switch cell transfer delay time when the i-th bit of a cell is transferred from a unit switch (x) to the next unit switch (x+1) by the serial operation. Reference characters designated in the same drawings have the following meanings respectively.

CK: Cell transfer clock signal
K(x): Cell transfer clock signal in the unit switch (x)
CK(x+1): Cell transfer clock signal in the unit switch (x+1)
Tstr: Time required for outputting data of a cell to a node D from rise of CK(x)
Topb: Output buffer internal delay time
Tlin: Cell transfer delay time
Tipb: Input buffer internal delay time
Tset: Set-up time of a data-type flip-flop (DFF)
Ts(x, x+1): Skew (phase shift) between CK(x) and CK(x+1)
Tcyc: Cycle of CK, CK(x), CK(x+1)
Ftrns: Frequency of CK, CK(x), CK(x+1)

If the above-mentioned switch-to-switch cell transfer delay time is now designated by Tdly, the delay time Tdly can be expressed as follows based on the timing chart given in FIG. 2.

$$\begin{aligned} Tdly &= Tcyc \\ &= Tstr + Topb + Tlin + Tipb + Tset + Ts(x, x+1) \end{aligned}$$

Namely, Tdly or Tcyc is obtained as follows under the following conditions:

Tstr = 1 ns
Topb = 3 ns
Tlin = 1 ns
Tipb = 3 ns
Tsct = 1 ns
Ts(x, x+1) = 1 ns
Tdly = Tcyc = 11 ns As the result, the maximum transfer frequency Ftrns on the serial transfer operation becomes as follows:

Ftrns = 1/Tcyc = 90.9 Mbps.

On the other hand, both Tlin and Ts(x, x+1) become large in FIG. 2 as the scale of the cell switch system becomes large, for example, as the number of input-output channels becomes 256 to 1024. Therefore, Ftrns becomes small with enlargement of the switching scale.

According to the conventional synchronous-type system, It becomes difficult to make the system large in scale while keeping the cell transfer frequency at a suitable value.

The cell switch system disclosed by the inventors in Japanese Patent Application No.135819/1989 is so constructed as to realize a function (hereinafter called simultaneous cell Input-output function) for executing input and output of cells at the same time by division transfer by unit switches, in order to reduce the time (hereinafter called cell delay time) from input to output of the cells. However, according to the synchronous-type system, it is not possible to execute the simultaneous cell input-output function by a specific unit switch preferentially to the other unit switches, because the input and output operation of cells are executed at the same time by all of the unit switches. Therefore, in the cell switch system of this case, there still remains a problem in that the simultaneous cell input-output function can not be utilized effectively.

Like this, the conventional technology for realizing the simultaneous cell input-output function depends only on the synchronous routing switch network with no cell storing means (buffer). However, in case of asynchronous routing networks, a problem is that each unit switch can not output cells to the following unit switch until the preparation for receiving the cells from the former switch is completed in the latter switch. Therefore, it is very difficult to apply the asynchronous routing network to the conventional method of realizing the simultaneous cell input-output function.

Generally, in digital information processing systems employing the asynchronous-type system, the hardware must be complicated to control the respective asynchronous function blocks to be in synchronous relation to one another. Therefore, it becomes very difficult to design timing for the whole operation. Moreover, since it takes much time to establish the synchronism relation, the cell delay time is increased.

In the cell switch system based on the conventional multi-stage self routing network with buffers, each unit switch is not provided with means for stopping the generating of a clock signal for driving the cell input-output means when no input and output of cells are executed. Therefore, the power consumption is unnecessarily large.

As stated above, the following problems exist in the conventional cell switch system:

(1) it is very difficult to attempt to make the switch system large in size while keeping the cell transfer frequency at a desired value in the synchronous-type operation system, (2) the simultaneous cell input-output function is not efficiently utilized because the unit switches always execute the input and output of cells at the same time in the synchronous operation system, (3) it is not possible to apply the conventional method of realizing the simultaneous cell input-output function to the asynchronous-type routing switch network, (4) asynchronous operation of the routing network requires complicated hardware and difficult timing design, and (5) the unit switches constructing the network tend to unnecessarily and greatly increase the power consumption of the whole system.

SUMMARY OF THE INVENTION

The present invention was made to solve the above-mentioned problems of the conventional technology. Therefore, it is an object thereof to provide a cell switch system based on the multi-stage self routing network with buffers comprising unit switches, wherein each unit switch on the network can be operated asynchronously and an extremely high cell transfer frequency can be realized with simple hardware.

Moreover, it is another object of the present invention to provide a cell switch system based on the multi-stage self routing network with buffers comprising unit switches, wherein the system has the simultaneous cell input-output function, can be operated with relatively small cell delay time, and can be applied in asynchronous routing networks.

It is still another object of the present invention to provide a cell switch system which can generate the cell transfer clock signal only on transferring cells, and can be operated with relatively small power consumption. The term "clock signal" is understood as a train of pulses for the synchronization of data processing and the measuring of time.

To achieve these objects, an aspect of the present invention is to provide a unit cell having two input communication routes A and B and two output communication routes U and D, so as to input cells, respectively, having information on transfer routes from these input communication routes A and B, and output them from one of these output communication routes U and D in accordance with the route information of the respective cells, wherein, as shown in FIG. 7, the unit cell switch further comprises two cell input-side data format conversion means SP A and SP B, which are respectively provided to the input communication routes A and B to receive cells from the same input communication routes A and B, two cell output-side data format conversion means PS U and PS D, which are respectively provided to the output communication routes U and D to output cells to the same output communication routes U and D, two cell storing means BUF A and BUF B, which are respectively provided to the cell input-side data format conversion means SP A and SP B to receive and temporarily store cells given from the same cell input-side data format conversion means SP A and SP B, wherein the read and write operations of cells are controlled based on address information. The unit cell switch further has cell transfer control means TCTR, which holds the route information of cells stored in the cell storing means BUF A and BUF B and the write address information of the cells stored in the same cell storing means BUF A and BUF B, controls addresses of the cell storing means BUF A and BUF B as unitary data, and decides, for example, a write address WAA4-0 of the cell storing means BUF A to which is given a cell from the cell input-side data format conversion means SP A, and a read address RAA4-0 of the cell storing means BUF A from which is given a cell to cell switch means CRSBSW, based on the route information and the address information. Cell switch means CRSBSW is for introducing desired cells to the cell output-side data format conversion means PS U and PS D from the respective cell storing means BUF A and BUF B under control of the transfer control means TCTR.

According to another aspect of the present invention, there is provided a unit cell switch, wherein, for example as shown In FIG. 7, the cell input-side data format conversion means SP A converts cells given from the cell input communication route A into eight block data, and outputs the cells consisting of eight block data to the cell storing means BUF A one block data at a time. The cell storing means BUF A is assigned addresses respectively corresponding to these block data and is provided with means for accessing these block data one block data at a time, receives these eight block data converted by the cell input-side data format conversion means corresponding to the cell storing means BUF A one block data at a time, and then outputs the cells stored in the cell storing means BUF A by one block data to the cell switch means CRSBSW one block data at a time. The cell output-side data format means PS U receives cells consisting of eight block data to be outputted from the cell storing means BUF A or BUF B through the cell switch means CRSBSW by one block data at a time, and then outputs the block data received therein to the cell output communication route U corresponding to the cell output-side data format conversion means PS U by one block data at a time. Thereafter, the cell transfer means TCTR picks up and receives the route information of each cell stored, for example, in the cell storing means BUF A in advance before the write operation of the cell to the cell storing means BUF A is completed, and if required, starts the output operation of the cell from the cell storing means BUF A in advance before the write operation of the cell to the cell storing means BUF A is completed.

According to still another aspect of the present invention, there is provided a unit cell switch comprising two input communication routes A and B and two output communication routes U and D, so as to input cells respectively having information on transfer routes from these input communication routes A and B, and to output them from one of these output communication routes U and D in accordance with the route information of the respective cells, wherein, as shown In FIG. 7, the unit cell switch further comprises a standard clock signal input terminal SYCK. Groups of terminals respectively corresponding to the input communication routes. For example, a cell input terminal DATAA is for inputting cells given from the input communication route A, a cell input clock signal input terminal BTCKA is for inputting a cell input clock signal BTCKA as a clock signal for transferring cells given from the input communication route A, a cell input request signal output terminal RDYA is for outputting a cell input request signal RDYA as a signal for requesting input of cells from the input communication route A, and a cell input start signal input terminal STBA is for inputting a cell input start signal STBA as a signal for designating start of inputting cells from the input communication route A. Groups of terminals also respectively corresponding to the output communication routes. For example, a cell output terminal DATAU is for outputting cells to the output communication route U, a cell output clock signal input terminal BTCKU is for outputting a cell output clock signal BTCKU as a clock signal for transferring cells to the output communication route U, a cell output request signal input terminal RDYU is for inputting a cell output request signal RDYU as a signal for requesting output of cells to the output communication route U, and a cell output start signal output terminal STBU is for outputting a cell output start signal STBU as a signal for designating start of outputting cells to the output communication route U. In the above-mentioned cell input-side data format conversion means SP A is operated in synchronism with a clock signal BCKA based on the clock signal BTCKA inputted from the cell input clock signal input terminal BTCKA, and the above-mentioned cell output-side data format conversion means PS U is operated in synchronism with a clock signal SCK based on the clock signal SYSCK inputted from the standard clock signal input terminal SYSCK.

Moreover, according to still another aspect of the present invention, there is provided a unit cell switch, wherein, for example as shown In FIG. 7, the cell storing means BUF A comprises a 2-port RAM which includes, as shown in FIG. 8, a write-only bit line WENA and a read-only bit line RENA both corresponding to a unit memory cell 10, a write-only word line WAA4-0 and a read-only word line RAA4-0 both corresponding to the unit memory cell 10, write designation means 11 and read designation means 12 for independently selecting cells to be written or read, and means for independently executing the write and read operations of cells both by controlling the write operation in accordance with a first clock signal B8CKA and by controlling the read operation in accordance with a second clock signal S8CK, the first and second clock signals B8CKA and S8CK being independent or asynchronous to each other. Moreover, the cell input-side data format conversion means SP A is operated in synchronism with the clock signal BTCKA inputted from the cell input clock signal input terminal BTCKA corresponding to the same cell Input-side data format conversion means SP A, the first clock signal is the clock signal B8CKA based on the clock signal BTCKA to be inputted from the cell input clock signal input terminal BTCKA corresponding to the cell input-side data format conversion means SP A in the cell storing means BUF A corresponding to the cell input-side data format conversion means SP A, and the second clock signal is the clock signal S8CK based on the clock signal SYSCK to be inputted from the standard clock signal input terminal SYSCK in the cell storing means BUF A corresponding to the cell Input-side data format conversion means SP A, while, the cell transfer control means TCTR, cell output-side data format conversion means PS U and PS D and cell switch means CRSBSW are respectively operated in synchronism with the clock signals SCK and S8CK based on the clock signal SYSCK to be inputted from the standard clock signal input terminal SYSCK, so that cell output clock signals BTCKU and BTCKD to be outputted from the unit cell switch are based on the clock signal SYSCK inputted from the standard clock signal input terminal SYSCK.

According to still another aspect of the present invention, there Is provided a unit cell switch, further comprising, for example as shown in FIG. 7, control means OCTR, which decides whether or not the clock signal SCK and the cell output clock signal BTCKU for driving the cell output-side data format conversion means PS U corresponding to the cell communication route U be generated based on whether or not cells are outputted from the same cell output communication route U.

Moreover, according to still another aspect of the present invention, there is provided a cell switch, comprising, as shown in FIG. 9, 12 units of unit cell switches, each unit cell switch including eight input communication routes and eight output communication routes, so as to input cells respectively having transfer route information from these input communication routes and output the inputted cells from one of the eight output communication routes in accordance with the transfer route information of the cells, wherein a predetermined switch network is constructed by connecting the output communication routes and the input communication routes of these unit switches to one another based on a predetermined rule.

According to still another aspect of the present invention, there is provided a cell switch, comprising, as shown in FIG. 9, 12 units of unit cell switches, each unit cell switch including eight input communication routes and eight output communication routes, so as to input cells respectively having transfer route information from these input communication routes and output the inputted cells from one of the eight output communication routes in accordance with the transfer route information of the cells, wherein these unit switches are independently and asynchronously operated.

According to still another aspect of the present invention, there is provided a cell switch, comprising, as shown in FIG. 10, 12 units of unit cell switches, each unit cell switch including eight input communication routes and eight output communication routes, so as to input cells respectively having transfer route information from these input communication routes and output the inputted cells from one of the eight output communication routes in accordance with the transfer route information of the cells, wherein a predetermined switch network is constructed by connecting the output communication routes and the input communication routes of these unit switches to one another based on a predetermined rule, so that in connection relation, for example, between the terminals corresponding to the output communication route U of a unit switch (00) and the terminals corresponding to the input communication route A of another unit cell switch (01), the cell output terminal DATAU on the output communication route U of the unit cell switch (00) is connected to the cell input terminal DATAA on the input communication route A of the unit cell switch (01), the cell output clock signal output terminal BTCKU on the output communication route U of the unit cell switch (00) is connected to the cell input clock signal input terminal BTCKA on the input communication route A of the unit cell switch (01), the output request signal input terminal RDYU on the output communication route U of the unit cell switch (00) is connected to the cell input request signal output terminal RDYA on the input communication route A of the unit cell switch (01), and the cell output start signal output terminal STBU on the output communication route U of the unit cell switch (00) is connected to the cell input start signal input terminal STBA on the input communication route A of the unit cell switch (01).

According to still another aspect of the present invention, there is provided a cell switch as shown in FIGS. 9 and 10, wherein the respective clock signals SYSCK to be inputted to the respective standard clock signal terminals SYSCK provided in the respective unit cell switches are independent and asynchronous to one another.

Therefore, according to the unit cell switch of the present invention, for example, the cell input-side data format conversion means SP A converts cells inputted from the cell input communication route which corresponds to the same means SP A, into eight block data, and then outputs the converted cells consisting of eight block data to the cell storing means BUF A, which corresponds to the same means SP A, by one block data at a time. The cell storing means BUF A is assigned addresses respectively corresponding to these block data and is provided with means for accessing these data one block data at a time, writes the cells consisting of eight block data inputted from the cell input-side data format conversion means SP A corresponding to the same cell storing means BUF A one block data at a time, and thereafter outputs the cells stored in the same cell storing means BUF A separately by one block data to the cell switch means CRSBSW one block data at a time. On the other hand, the cell output-side data format means PS U inputs the cells consisting of eight block data to be outputted from the cell storing means BUF A or BUF B through the cell switch means CRSBSW by one block data at a time, and then outputs each block data to the cell output communication route U corresponding to the same cell output-side data format conversion means PS U. In this case, the cell transfer means TCTR picks up the route information of cells stored in the cell storing means BUF A in advance, before the write operation of the cells to the cell storing means BUF A is completed, and if required, starts the output operation of the cells from the cell storing means BUF A in advance before the write operation of the cells to the cell storing means BUF A is completed. Moreover, the control means OCTR decides, for example, whether the clock signal SCK and the cell output clock signal BTCKU for driving the cell output-side data format conversion means PS U corresponding to the cell communication route U be generated, in accordance with the result of whether or not cells are outputted from the cell output communication route U. Incidentally, each cell input-side data format conversion means, for example, the conversion mean SP A is operated in synchronism with the clock signal BCKA based on the clock signal BTCKA to be inputted from the cell input clock signal terminal BTCKA corresponding to the same cell input-side data format conversion means. The cell transfer control means TCTR, cell output-side data format conversion means PS U and PS D and cell switch means CRSBSW are respectively operated in synchronism with the clock signals SCK and S8CK based on the clock signal SYSCK to be inputted from the standard clock signal input terminal SYSCK. Therefore, the unit cell switch outputs the cell output clock signals BTCKU and BTCKD as clock signals based on the clock signal SYSCK to be inputted from the standard clock signal input terminal SYSCK.

Moreover, according to the cell switch of the present invention, the clock signals SYSCK respectively inputted to the standard clock signal terminals SYSCK respectively included in the plurality of unit cell switches constructing a predetermined switch network as shown in FIGS. 9 and 10 are independent and asynchronous to one another, therefore, the respective unit cell switches are operated independently and asynchronously.

These and other objects, features and advantages of the present invention will be more apparent from the following description of a preferred embodiment, taken in conjunction with the accompanying drawings.

BRIEF DESCRIPTION OF THE DRAWINGS

FIG. 10 shows connection relation between signals to be given to the respective unit switches shown in FIG. 9;

FIG. 12 shows a timing chart for explaining the cell transfer operation of a unit switch.

DETAILED DESCRIPTION OF THE PREFERRED EMBODIMENTS

Before embodiments relating to this invention are described, one embodiment comprising giving a asynchronous transfer function to a conventional cell switch disclosed by the inventors in Japanese Patent Application No. 135819/1989 is now explained.

First, construction of the conventional technology is explained with reference to the disclosure of Japanese Patent Application No. 135819/1989.

Figure 1:
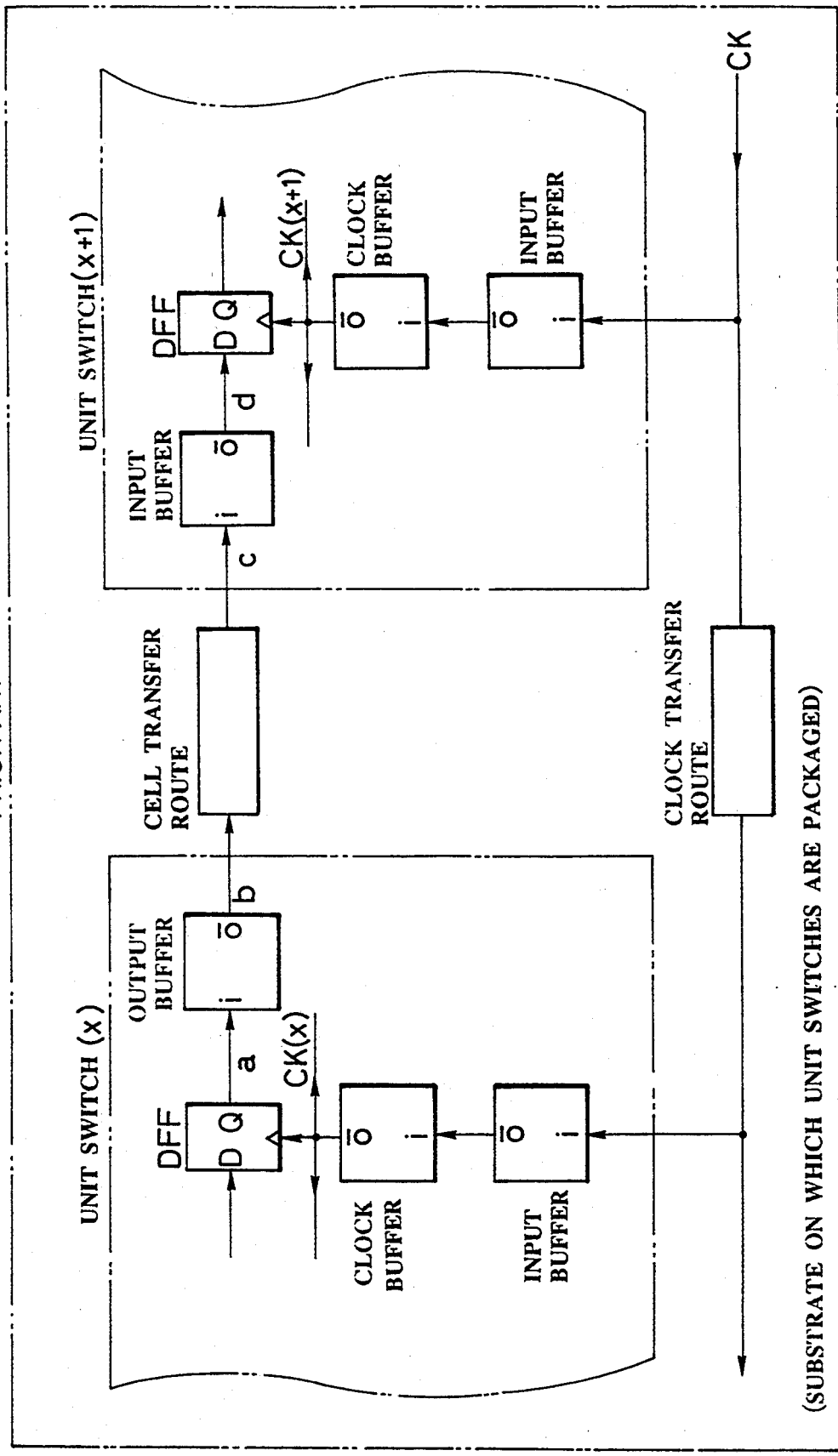
FIG. 1 shows an interface between two unit switches respectively operated based on the synchronous-type routing network.
Figure 2:
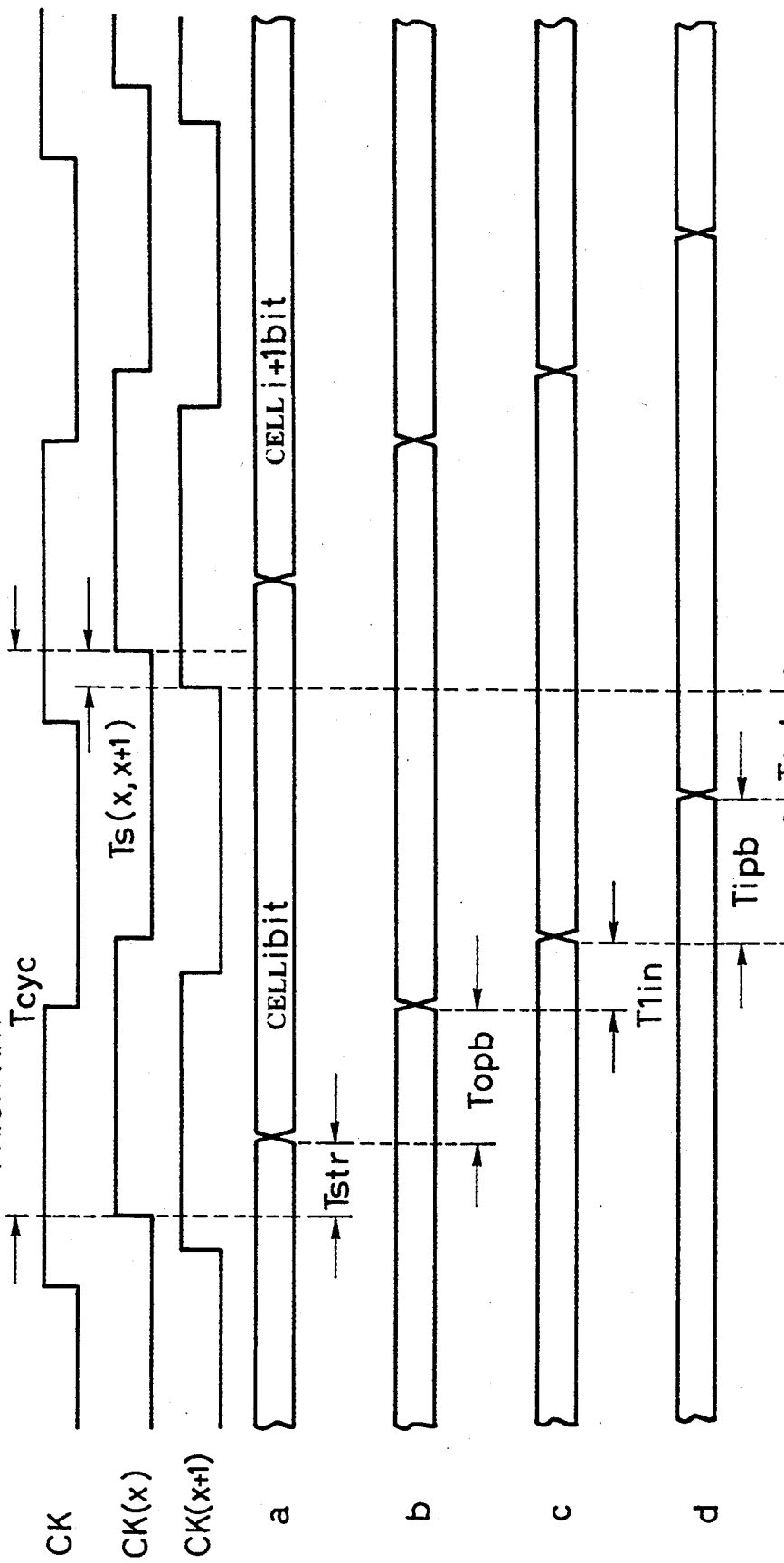
FIG. 2 shows a timing chart for explaining the operation of the system shown in FIG. 1.
Figure 3:
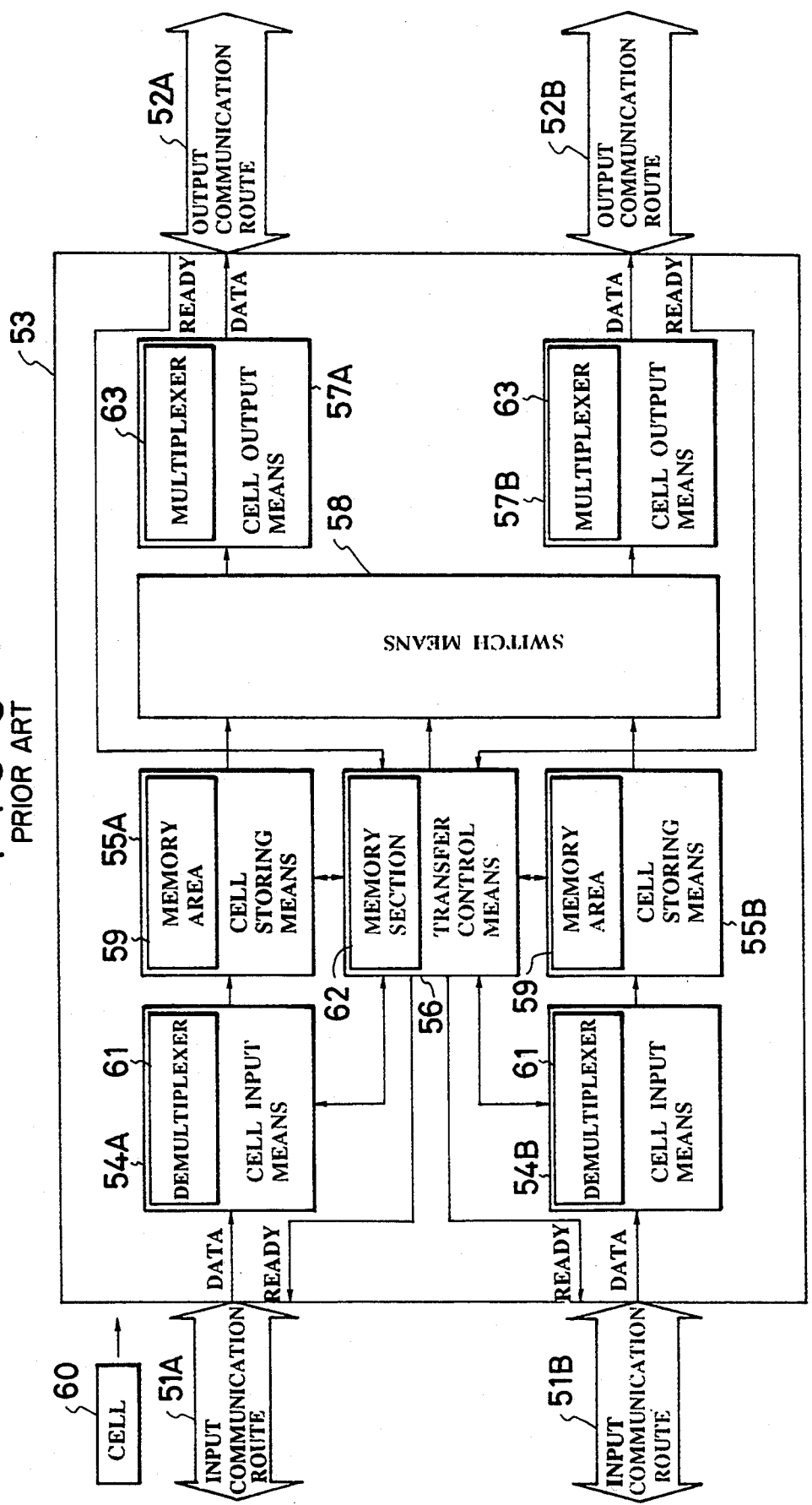
FIG. 3 is a block diagram showing construction of a conventional cell switch.

FIG. 3 is a block diagram showing construction of a conventional cell switch. As shown in the same drawing, the cell switch is suitable to construct a multi-stage self routing network with buffers containing two input communication routes 51A, 51B and two output communication routes 52A, 52B.

In the same drawing, reference numeral 53 denotes a cell switch, 54A, 54B are cell input means respectively corresponding to the input communication routes 51A, 51B, 55A, 55B are cell storing means respectively corresponding to the cell input means 54A, 54B, 56 is transfer control means for holding transfer route information of cells stored in the cell storing means 55A, 55B, designating cells to be outputted from the cell storing means 55A, 55B based on the transfer route information, and outputting specific cells from specific cell storing means 55A, 55B. Moreover, 57A, 57B are cell output means for outputting cells to the output communication routes 52A, 52B contained in the cell switch, and 58 shows switch means for introducing cells outputted from the cell storing means 55A, 55B to desired cell output means 57A, 57B under control of the transfer control means 56.

The cell storing means 55A, 55B respectively have memory areas 59 in which cells can be stored in predetermined numbers. In the memory means 59, one address is given to each unit able to be written or read at a predetermined write or read cycle, and each write or read area of the respective cell storing means 55A, 55b is designated by the address. Such a memory area 59 can be realized with a semiconductor memory using the current LSI technology.

In this case, these cell storing means 55A, 55B are characterized in that each cell can be inputted thereto by executing a predetermined number of write cycles. This means that the bit width possible to be inputted to the cell storing means 55A or 55B at one write cycle is set shorter than the length of a bit row for constructing a cell 60. In case of inputting the cell 60, a series of addresses are given corresponding to the plurality of write cycles to be required.

Moreover, the cell 60 is outputted from the cell storing means 55A, 55B by executing a plurality of read cycles determined here in advance. This means that the bit width possible to be outputted from the cell storing means 55A, 55B at one read cycle is set shorter than the length of a bit row for expressing the cell 60. In case of outputting the cell 60, a series of addresses are given corresponding to the plurality of read cycles to be required.

As stated above, in case of input or output of cells in this conventional system, designation of the specific cell 60 or designation of a specific write area of the cell 60 in the memory area 59 of the cell storing means 55A, 55B can be executed by introducing a new identifier corresponding to a series of addresses to be given for the cell 60. This identifier introduced to the series of addresses is called entry. For example, in case of using a semiconductor memory according to well known LSI technology where each address is expressed by a binary number as the memory area and selecting the number of the read cycles or write cycles from the exponents of 2, it is also possible to prepare address signals to be given to the above-mentioned memory area 59 by giving a bit row for designating such an entry to some of address signals to be given to the memory area, and giving another bit row to be generated by a counter which is cleared at start of input or output of each cell and incremented at each write cycle or read cycle to be carried out for inputting or outputting each cell to the address signals other than those used for designating the entry.

Incidentally, the cell 60 inputted by the input communication route 51A or 51B is stored in the cell storing means 55A or 55B through the cell input means 54A or 54B. Each of the cell input means 54A, 54B includes a demultiplexer 61 for converting the parallel mode of transferring a bit row by the input communication route 51A, 51B into the parallel mode of storing the bit row in the cell storing means 55A, 55B, catches a series of write cycles of the cell storing means 55A, 55B and writes the bit row of each cell 60 in the storing means 55A, and 55B, moreover, transfers a bit to be designated by the position of the cell switch 58 in the switch network for realizing the self routing function to the transfer control means 56.

The transfer control means 56 grasps a state of storing cells stored in each cell storing means 55A, 55B, and newly decides an entry of each cell storing means 55A, 55B when a new cell 60 is inputted from the cell input means 54A or 54B. Moreover, the transfer control means 56 is provided with a memory section 62 for storing route information to be given to the same means 56 when a cell is inputted thereto from the cell input means 54A, 54B, and decides an entry to be assigned to the cell storing means 55A or 55B on outputting the cell. The transfer control means 56 decides a timing for starting output of the cell 60 from each cell storing means 55A, 55B. In this case, it is preferred that the cell switch 58 including the transfer control means 56 decides the timing based on the state of target cell storing means (55A, 55B) to which the cell 60 is outputted. Namely, the transfer control means 56 controls the cell storing means 55A, 55B so that the cell 60 is outputted to the target cell storing means (55A, 55B) only when an entry capable of newly receiving the cell 60 exists in the target cell storing means (55A, 55B).

In this case, the existence of the entry capable of receiving a new cell 60 in the target cell storing means (55A, 55B) is known by making active a ready signal to be outputted from another transfer control means (56) for controlling the target cell storing means (55A, 55B). As the result, the transfer control means 56 from which the new cell 60 is outputted obtains the ready signal through the output communication routes 52A, 52B so as to grasp the state of the target cell storing means (55A, 55B).

Moreover, in the transfer control means 56, it is also possible to decide a cell 60 inputted from the input communication routes 51A, 51B as a cell to be outputted from the cell storing means 55A, 55B just after the route information of a cell 60 is given thereto. As the result, it becomes possible to output the cell 60 rapidly even if these cell storing means 55A, 55B have no other cells 60. Therefore, the cell delay time can be much reduced as compared with the case where the cell 60 must be outputted after the cell storing means 55A, 55B are filled with cells 60.

The switch means 58 is operated under control of the transfer control means 56 to introduce a bit row of the cell 60 outputted from each cell storing means 55A or 55B to desired cell output means 57A or 57B. Incidentally, the switch means 58 comprises parallel crossbar switches each capable of simultaneously switching the parallel mode of the bit row to be outputted from the cell storing means 55A, 55B by one output cycle. As is well known, the crossbar switch may be constructed by crossing two input signal lines with two output signals lines, and arranging switches capable of external open-close control at the respective intersections for introducing a signal from the input signal lines to the output signal lines. Namely, by arranging a plurality of crossbar switches, it becomes possible to execute simultaneously switching the parallel mode of the bit row to be outputted from the cell storing means 55A, 55B.

The cell output means 57A, 57B respectively include multiplexers for converting the parallel mode for outputting a bit row from each cell storing means 55A, 55B into the parallel mode for transferring the bit row through each output communication route 52A, 52B, thereby to continuously send cells 60 from the cell storing means 55A, 55B to the output communication routes 52A, 52B.

Figure 4A:
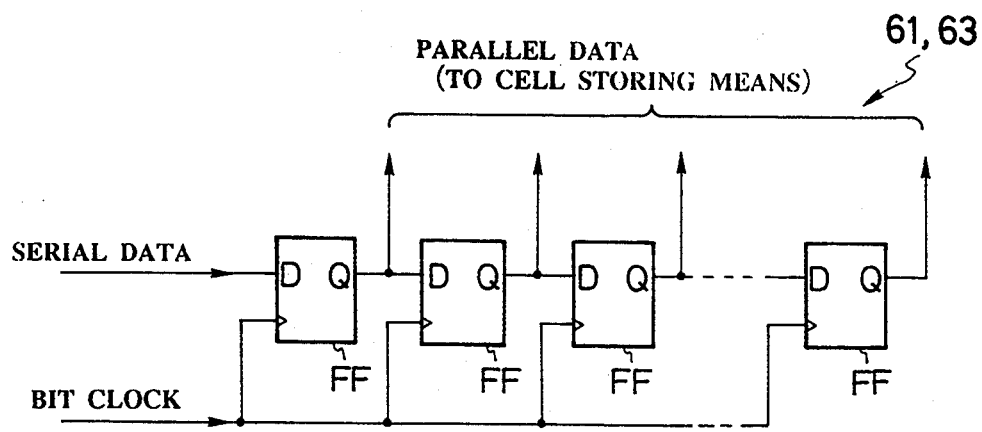
FIGS. 4(a) and 4(b) show examples of construction of a conventional demultiplexer and a conventional multiplexer respectively.
Figure 4B:
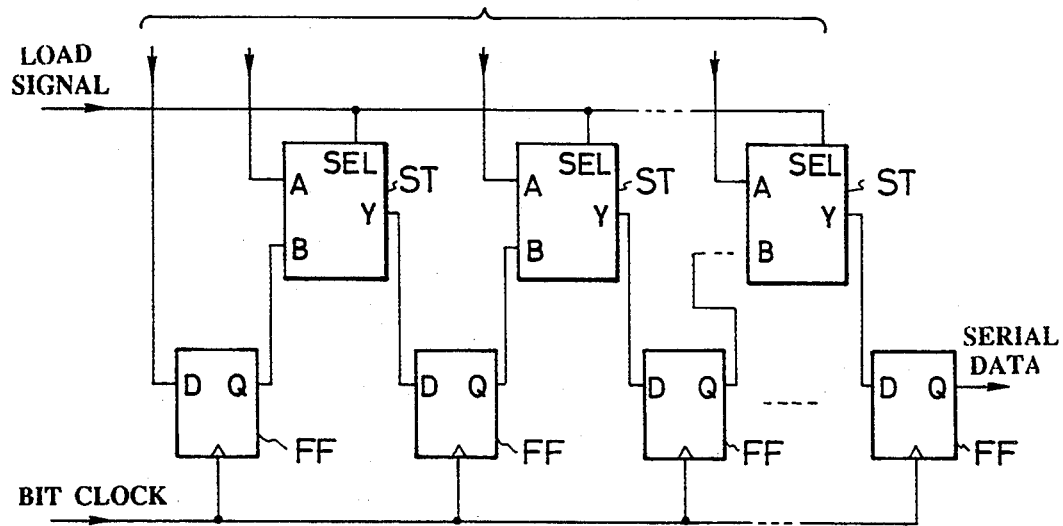

FIGS. 4(a) and 4(b) show a demultiplexer 61 included in the cell input means 54A, 54B and a multiplexer 63 included in the cell output means 57A, 57B, respectively.

In the same drawings, reference character FF means a D-type flip-flop, and ST is a 2-input-1-output selector.

Shown in FIG. 4(a) is a known series-parallel conversion shift register, while in FIG. 4(b) a known parallel-series conversion shift register is shown. By providing these shift registers in accordance with the parallel mode for transferring a bit row in the input communication routes 51A, 51B or in the output communication routes 52A, 52B, the demultiplexer 61 or multiplexer 63 can be constructed.

In this case, to each register forming these shift registers, a clock capable of sampling a bit row transferred by the input communication routes 51A, 51B or the output communication routes 52A, 52B is given as a bit clock. For example, in case of a B-ISDN network based on the current 150 Mbps interface rate of UNI, when a bit row is transferred by the input communication routes 51A, 51B or the output communication route 52A, 52B in the transfer parallel mode of 1, that is, the bit row is transferred by the same routes in the completely serial state, the clock to be given to each register included in these shift registers has a frequency of 150 MHz.

Incidentally, almost all of the power consumption in the cell switch of this case is attributed to the demultiplexer 61 or the multiplexer 61. If the bit clock is not given to each register constructing the demultiplexer 61 or multiplexer 68 when the cell 60 is not inputted or outputted by them, the register is operated during the input or output operation of the cell 60 only. Namely, the register can be operated only when the cell 60 is inputted to the demultiplexer 61 or outputted from the multiplexer 63. As the result, the power consumption of the cell switch 53 of this case can be reduced. Incidentally, the construction of the demultiplexer 61 or multiplexer 63 is not limited to those shown in FIGS. 4(a) and 4(b), it is also possible to construct them by combining suitable selectors and counters.

Moreover, in the cell switch 53 of this case, since it is not possible to store one or more cells in each of the switch means 58 and cell output means 57A, 57B, it is preferred to start the output of cells from the cell storing means 55A, 55B at the same time.

Furthermore, in the cell switch 53 of this case, there is the possibility that the input and output of cells 60 are executed at the same time to both cell storing means 55A, 55B. However, since each cell to be outputted is selected by the transfer control means 56 from cells 60 already stored in the cell storing means 55A, 55B from the cell input means 54A, 54B, if the input rate of cells 60 to the cell storing means 55A, 55B is equal to or higher than the output rate of cells 60 from the cell storing means 55A, 55B, the write cycle and the read cycle to the same address are never generated at the same time.

Therefore, in the cell switch 53 of this case, it is preferred that the memory area 59 included in each of the cell storing means 55A, 55B is a semiconductor memory according to known LSI technology, which can be used as a 2-port RAM able to simultaneously execute data input and data output to different addresses. Namely, by using such a 2-port RAM, it can be avoided that the write or read cycle should be unnecessarily hastened.

Moreover, in case of the cell switch 53 of this case, if the input rate of cells 60 is lower than the output rate thereof, the write cycle and read cycle to the same address may be generated. This problem is attributed to the construction such that the input or output of each cell is divided into a plurality of write or read cycles so as to enable starting the output of the cell 60 without waiting completion of the input of the cell 60. However, by dividing the input or output of each cell 60 into a plurality of write or read cycles, it becomes possible to reduce the delay time in the cell switch 53 because an optional cell 60 given from the input communication route 51A or 51B can be selected as a candidate to be outputted when the route information of the cell 60 is given to the cell storing means 55A or 55B. Therefore, in this case, the input or output of the cell 60 is divided into a plurality of write or read cycles. Moreover, even if the input rate of the cell 60 to the cell storing means 55A, 55B is lower than the output rate of the cell from the cell storing means 55A, 55B, that is, when the cell transfer rate at the input communication routes 51A, 51B is lower than the cell transfer rate at the output communication routes 52A, 52B, the input rate of the cell 60 in the cell switch 53 can be made equal to the output rate thereof by preparing a suitable dual buffer for the rate conversion at the input section.

It is also possible to avoid the simultaneous generation of input and output of the cell 60 by selecting each cell 60 inputted from the input communication routes 51A, 51B to be outputted not when the route information of the cell 60 is inputted to the cell storing means 55A, 55B but when the input of the cell 60 is completed. Incidentally, it is more preferable that the cell switch 53 can decide the timing when the cell 60 to be outputted is selected.

Next, the mechanism of selecting the cell to be outputted according to the transfer control means 56 is explained with reference to FIG. 5.

Figure 5:
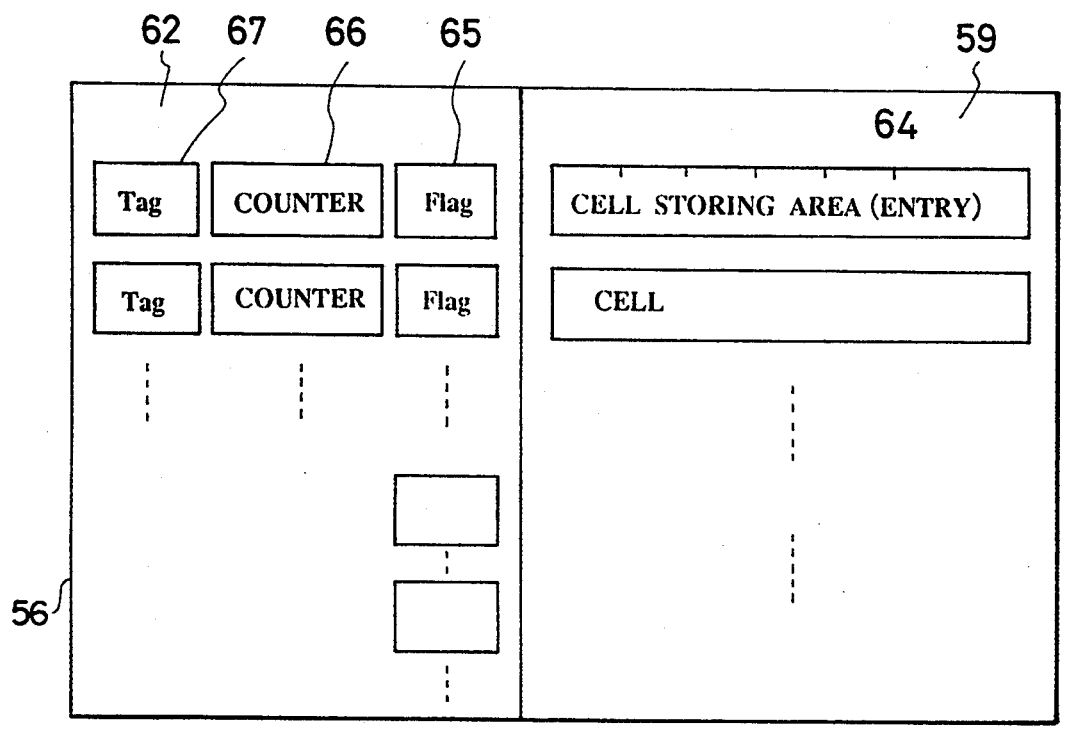
FIG. 5 shows an example of cell storing systems.

As shown in FIG. 5, the transfer control means 56 includes at least cell storing flags 65 which are respectively provided corresponding to entries 64 to be stored in the cell storing means 55A, 55B, so as to hold information on whether or not these entries 64 hold cells 60 respectively, counters for holding information on order in which the cells 60 respectively held in the entries 64 are given to the cell storing means 55A, 55B, and registers 67 for holding the route information of each cell 60 held in the entries 64.

When 1 bit in the route information of a cell 60 given from the cell input means 54A, 54B is inputted to the transfer control means 56, the 1 bit is inputted to the information register 67. In this case, the register 67 is designed to hold 1 bit of information. More specifically, the register 67 corresponds to a bit length equal to the least integer value exceeding the logarithm to the base 2 of N which is the number of the output communication routes included in the cell switch 53.

When cells 60 are inputted, the cell storing flags 65 as well as the registers 67 are respectively set corresponding to the entries 64 of the cell storing means 55A, 55B in which the cells 60 are held. Thereafter, the counters 66 corresponding to the cell storing flags 65 which are set are incremented.

On the other hand, when cells 60 are outputted, the counters 66 corresponding to the cell storing means 55A, 55B from which the cells 60 are outputted are respectively decremented, if the values of the counters 66 are larger than those of the counters 66 corresponding to the entries from which the cells 60 are outputted. Thereafter, the counters 66 corresponding to the entries 64 from which the cells 60 are outputted are reset at 0, and the cell storing flags 65 corresponding to these entries 64 are also reset.

As stated above, the input order of cells 60 to the cell storing means 55A, 55B can be grasped by changing the values to be held in each counter 66. Namely, the cell 60, which is stored in an entry 64 corresponding to a counter 66 having the maximum value, is the cell that is stored the longest in the cell storing means 55A, 55B. In this case, if cells other than the cell stored the longest are outputted by the preferential order decided by the route information, the counter 66 corresponding to the cell 60 stored the longest is decremented. Therefore, it is necessary for solving this problem to make a more complicated system than the construction of the communication buffer device disclosed in Japanese Patent Application for Disclosure No.63-64056. However, it is advantageous that each counter 66 for designating the input order never be overflowed.

Accordingly, the transfer control means 56 selects each cell 60 stored in an entry 64 corresponding to a counter 66 having the largest value from the cell storing means 55A, 55B. In this case, if the routes of the two cells 60 selected are same according to the route information given in the registers 67, the cells 60 to be outputted from the cell storing means 55A, 55B are respectively decided in a manner as mentioned below.

Figure 6:
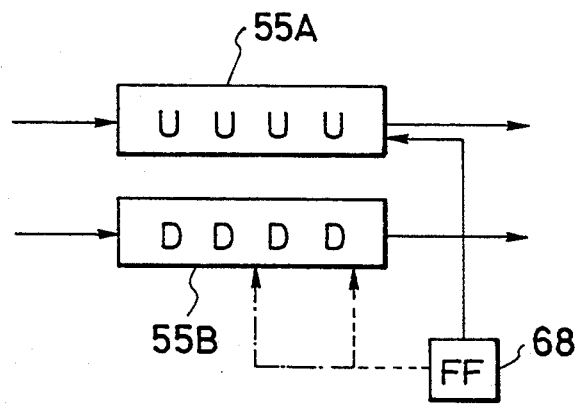
FIG. 6 shows an example of cell outputting systems.

In this case, if each cell to be transferred to the output communication route 52A is designated by U, and each cell to the output communication route 52B is designated by D, the transfer control means 56 detects the blocking when the head cells In both cell storing means 55A, 55B are same as shown in FIG. 6.

If the blocking is detected, the cells U or D to be transferred to the same output communication route 52A or 52B from both cell storing means 55A, 55B are outputted to the respective communication routes 52A, 52B alternately at least by toggle operation of a preferential cell storing designation flip-flop 68. Namely, it is possible to set a state where one of the output communication routes 52A or 52B receives the cells U or D from only one of the cell storing means 55A, 55B, while the other communication route 52A or 52B receives the cells U or D from the other cell storing means 55A or 55B.

Moreover, if the routes of the respective head cells in both cell storing means 55A, 55B are different, the cells U or D are outputted in parallel to the respective output communication routes 52A, 52B without executing the toggle operation by the flip-flop 68.

As stated above, all of the buffers included in the cell switch 53 can be used in parallel by alternately outputting the head cells of these buffers when the blocking occurs. Therefore, according to the cell switch capable of controlling the preference to each cell in accordance with the route Information, it becomes possible to suppress the time required for cells to be stored in the buffers to an allowable value.

Accordingly, the cell switch of the conventional technology can reduce the cell delay time, and suppress the time required for cells to be stored in the buffers to an allowable value. Moreover, each counter included in the cell switch for holding the input order of cells is never overflowed.

However, in the cell switch, since the input and output of cells are executed at the same time, the simultaneous cell input-output function is not effectively utilized. Moreover, the conventional method of realizing the simultaneous cell input-output function can not be applied to the asynchronous routing network. Namely, the aim of the present invention is to add the asynchronous transfer function to the conventional cell switch. The embodiments of the present invention described below are based on this idea.

Figure 7:
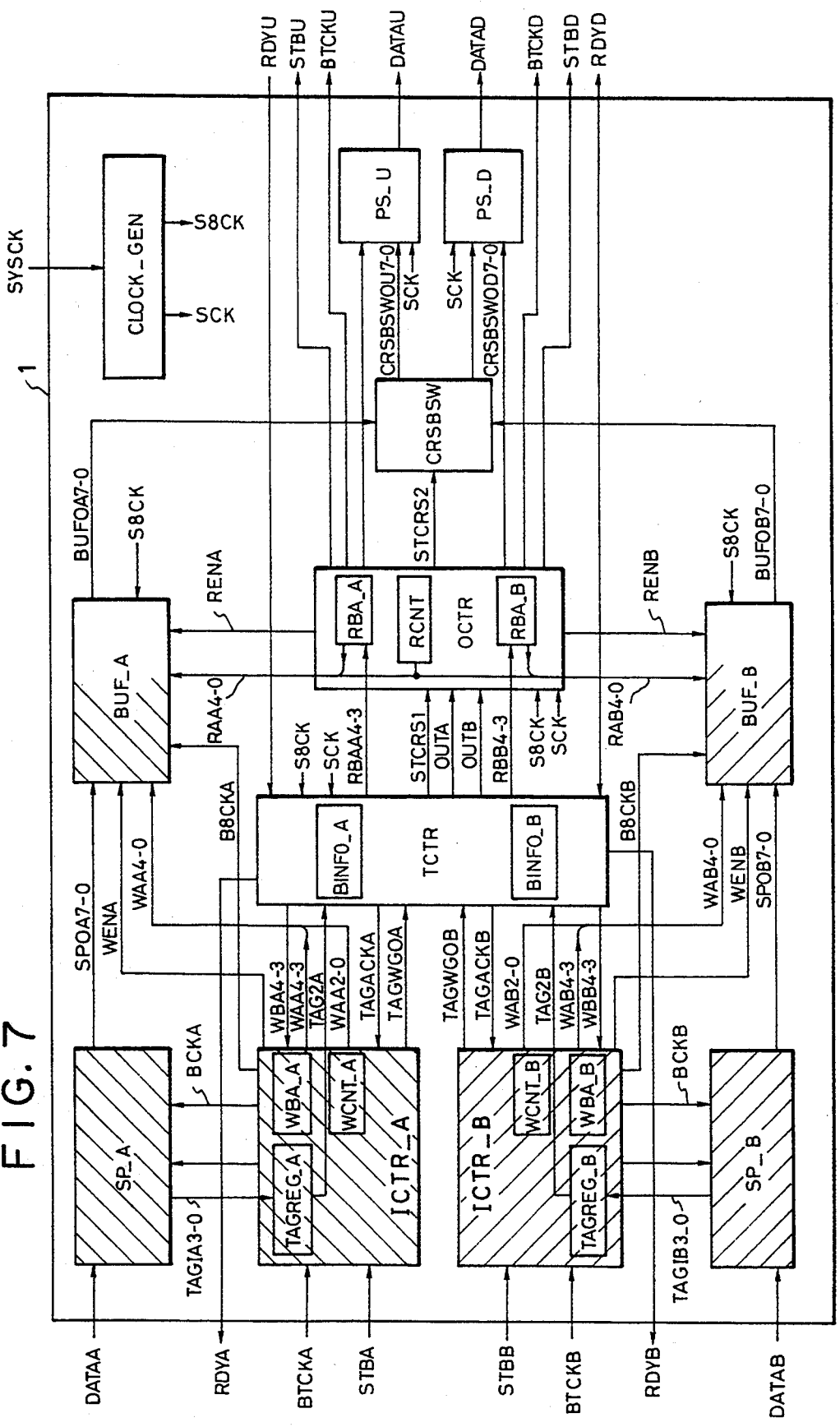
FIG. 7 shows construction of a 2-input-2-output unit switch as an embodiment of the present invention.

FIG. 7.shows construction of a 2-input-2-output unit cell switch relating to an embodiment of the present invention. This unit switch handles 64-bit cells each consisting of a 4-bit routing tag region and a 60-bit information region. Moreover, the unit switch is provided with two buffers which can contain four cells respectively, input communication routes A. B and output communication routes U, D, so as to present suitable construction to a multi-stage self routing network with buffers. In the same drawing, reference numeral 1 shows a unit cell switch, reference characters SP A and SP B are cell input-side data format conversion means, respectively corresponding to the input communication routes A and B, to receive cells from these input communication routes, and PS U and PS D are cell output-side data format conversion means, respectively corresponding to the output communication routes U and D, to output cells to these output communication routes. Moreover, BUF A and BUF B are cell storing means, which are respectively provided corresponding to the cell input-side data format conversion means SP A and SP B, to receive and temporarily store cells given from these cell input-side data format conversion means SP A and SP B, in which the read and write operations of cells are controlled based on address information. TCTR is cell transfer control means which holds the route information of cells stored in the cell storing means BUF A and BUF B and the address information indicative of the locations of the cell storing means in which the cells are stored, controls addresses of the cell storing means BUF A and BUF B, and decides, for example, a write address WAA4-0 of the cell storing means BUF A to which is given a cell from the cell input-side data format conversion means SP A, and a read address RAA4-0 of the cell storing means BUF A from which is given a cell to cell switch means CRSBSW based on the route and the address information. CRSBSW is cell switch means for introducing cells to desired cell output-side data format conversion means PS U and PS D from the respective cell storing means BUF A and BUF B under control of the transfer control means TCTR. OCTR is cell output control means. OCTR decides whether or not a clock signal SCK and a cell output clock signal BTCKU, or BTCKD respectively, used for driving the cell output-side data format conversion means, PS U, or PS D corresponding to the cell communication route U and D respectively are to be generated, based on whether or not cells are outputted from the same cell output-communication route U or D, respectively.

Next, these function blocks are respectively explained in detail.

The input-side data format conversion means (series-parallel conversion means) SP A and SP B convert 1-bit serial data DATAA and DATAB, respectively inputted from the input communication routes A and B into 8-bit data, and then outputs these converted data SPOA7-0 and SPOB7-0 to the cell storing means (buffers) BUF A and BUF B.

ICTR A and ICTR B are cell input control means which respectively control the write hardware system in SP A to BUF A and SP B to BUF B and the transfer control means TCTR, and also control the write operation of cells inputted from the input communication routes A and B to the buffers BUF A and BUF B and of routing tags (transfer route information) of the cells to the transfer control means TCTR. These ICTR A and ICTR B respectively include three kinds of memory means or count means. The first means are tag registers TAGREG A and TAGREG B which are respectively 1-bit registers for storing 1 bit selected from 4 bits of each routing tag of an inputted cell, and include selectors for selecting 1 bit from the 4-bit information. The second means are 3-bit binary counters WCNT A and WCNT B for preparing the cell write timings. Namely, these counters WCNT A and WCNT B produce write offset addresses (the lower 3 bits) WAA2-0 and WAB2-0 of the buffers BUF A and BUF B respectively, and are driven by cell input clock signals BCTKA and BTCKB and reset by cell input head designation signals STBA and STBB, respectively. Moreover, the third means are 2-bit registers WBA A and WBA B which respectively store write base addresses (the higher 2 bits) WAB4-3 and WBB4-B of the buffers BUF A and BUF B.

Figure 8:
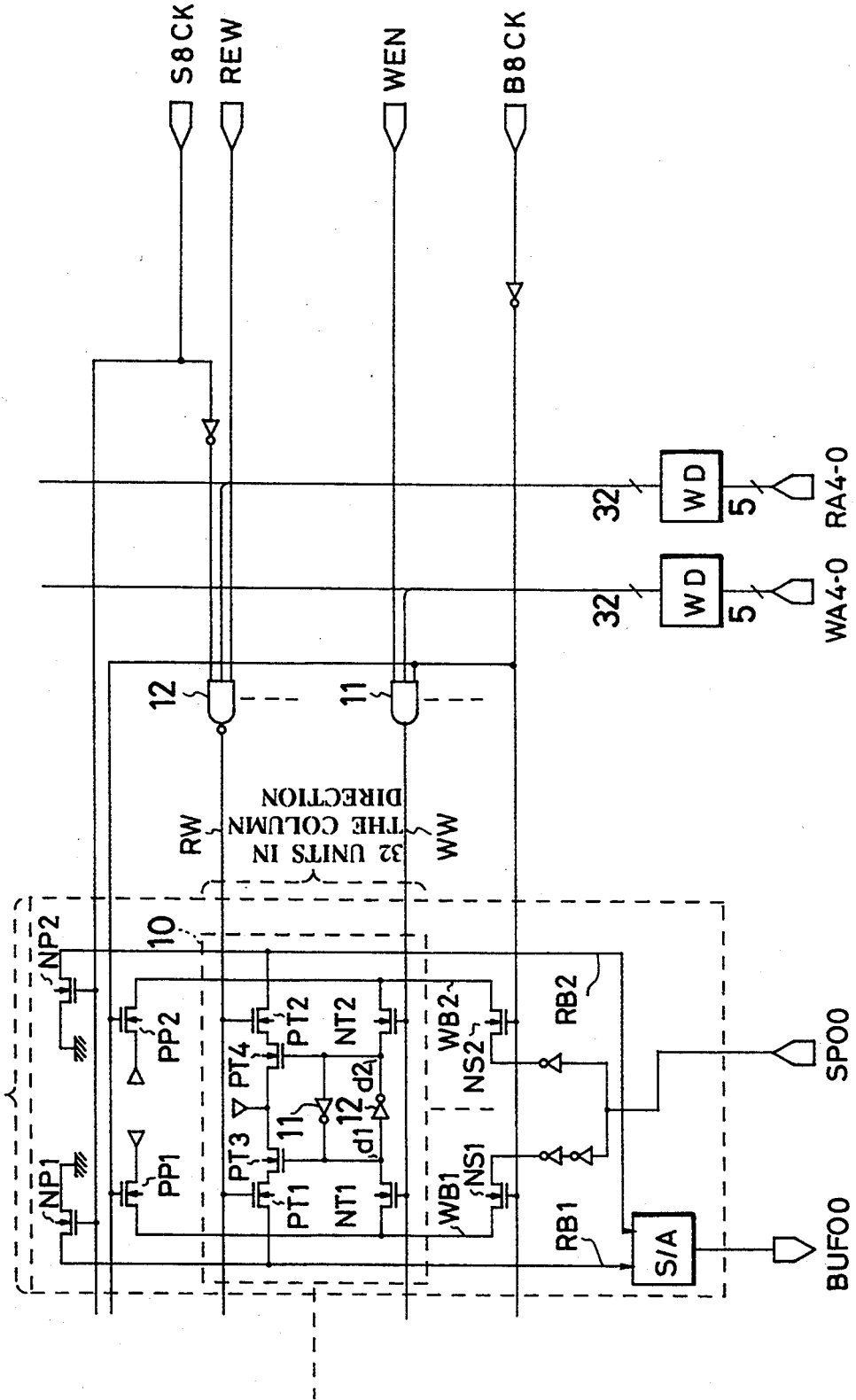
FIG. 8 schematically shows construction of a buffer BUF.

The cell storing means (buffers) BUF A and BUF B are respectively 2-port RAM's, and each 64-bit cell is contained in the same means BUF A or BUF B in the form of 8 bits×8 words. Moreover, each of BUF A and BUF B has a capacity of 8 bits×8 words×4 cells=8 bits×32 words so as to contain 4 cells. Incidentally, the part corresponding to the higher 2bits of 5 bits in each address is called base address, and the other to the lower 3 bits thereof is called offset address. Moreover, each base address Is used for storing each cell. As shown in FIG. 8, each of the buffers BUF A and BUF B is operated in synchronism with a clock, and has 2-port construction comprising 1 port for the write operation and 1 port for the read operation. Moreover, the RAM is so constructed that the write and read hardwares are separately driven by different clock signals. Namely, the write hardwares of the buffer BUF A and BUF B are respectively driven by signals B8CKA and B8CKB, respectively, produced by dividing the clock signals BTCKA and BTCKB into eight same cycles. The respective read hardwares are driven by a signal S8CK obtained by dividing a signal SCK into eight same cycles, the signal SCK being produced by buffering a clock signal SYSCK with a clock signal generating means CLOCK GEN.

The transfer control means TCTR is used for controlling the cell input operation, and produces cell Input request signals (for permission of inputting cells or completion of cell input preparation) RDYA and RDYB to be transferred to a unit switch of the previous stage.

The transfer control means TCTR of the unit switch on the previous stage receives the cell input request signals RDYA and RDYB sent from the following stage as cell output request signals RDYU or RDYD.

The means TCTR produces signals OUTA and OUTB for respectively designating output of cells from the buffers BUF A and BUF B and a signal STRAT1 for designating whether cell switch means CRSBSW be operated in the direct or cross mode, then outputs these signals to the cell output control means OCTR. Moreover, this means TCTR also controls and produces the cell storage addresses WBA4-3 and WBB4-3 to be used for the write operation of the buffers BUF A and BUF B and cell storage addresses RBA4-3 and RBB4-3 for the read operation of these buffers as unitary data, then outputs these data to the cell input control means ICTR A and ICTR B.

Incidentally, the transfer control means TCTR includes buffer information control means BINFO A and BINFO B, which are respectively provided with four 3-bit binary couters TIMECNT A3-0 and TIMECNT B3-0, respectively, able to count up and count down corresponding to the cell storage addresses of the buffers BUF A and BUF B, and four 5-bit registers BREG A3-0 and BREG B3-0, respectively, corresponding to the four cell storage addresses. Each of these registers is constructed with a 1-bit flag information region, a 1-bit routing tag information region and 3-bit cell arrival order information region. Incidentally, the cell arrival order information region comprises a 3-bit register for holding the count value of the 3-bit binary counters TIMECNT A3-0 and TIMECNT B3-0.

Now, each information region is further explained. The flag information region shows that a cell is not stored at the cell storage address of the corresponding buffer when the value is set at 0, and that the cell is stored in the same cell storage address when the value is set at 1. The routing tag information region shows that the cell stored at the cell storage address of the corresponding buffer is to be transferred to the output communication route U when the value is set at 0, and that the cell is to be transferred to the output communication route D when the value is set at 1. Moreover, the cell arrival order information region shows the order of arrival of cells at the unit switch, and the larger the value becomes, the earlier the order becomes.

The cell output control means OCTR controls the input and output of cells at the buffers BUF A and BUF B, cell output-side data format conversion means PS A and PS B and cell switch means CRSBSW. Moreover, the cell output control means OCTR has a cell-read counter RCNT and buffer-read base address registers RBA A and RBA B. The cell-read counter RCNT is a 3-bit binary counter for producing timings for reading cells, that is, the counter RCNT produces the read offset addresses RAA2-0 and RBA2-0 of the buffers BUF A and BUF B. The base address registers RBA A and RBA B are respectively used for storing the base addresses RAA4-3 and RAB4-3 for reading the buffers.

The cell switch means CRSBSW switches the communication routes of cells outputted from the buffers BUF A and BUF B, and the switching operation is executed by a signal STCRS2 adjusted by a timing which is controlled by the cell output means OCTR in accordance with a swich signal STCRS1. Namely, when the signal STCRS2 is 1, the data outputted from the buffer BUF A is transferred to the output communication route U, and the data from the buffer BUF B is transferred to the output communication route D (direct mode), while, when the signal STCRS2 is 0, the data outputted from the buffer BUF A is transferred to the output communication route D, and the data from the buffer BUF B is transferred to the output communication route U (cross mode).

Moreover, the cell output-side data format conversion means (series-parallel conversion means) PS U and PS B respectively convert 8-bit data transferred from the cell switch means CRSBSW into 1-bit serial data, and then outputs the converted data DATAU and DATAD to the respective output communication routes U and D.

Incidentally, the blocks designated by the oblique lines drawn in the direction from the right upper to the left lower in FIG. 7 are respectively driven by clock signals of the BTCKA signal system (the signals are produced by buffering or dividing/buffering the BTCKA signal), the blocks designated by the oblique lines drawn from the left upper to the right lower are respectively driven by clock signals of the BTCKB system. The other blocks not denoted by these oblique lines are respectively driven by clock signals of the SCK system.

Figure 9:
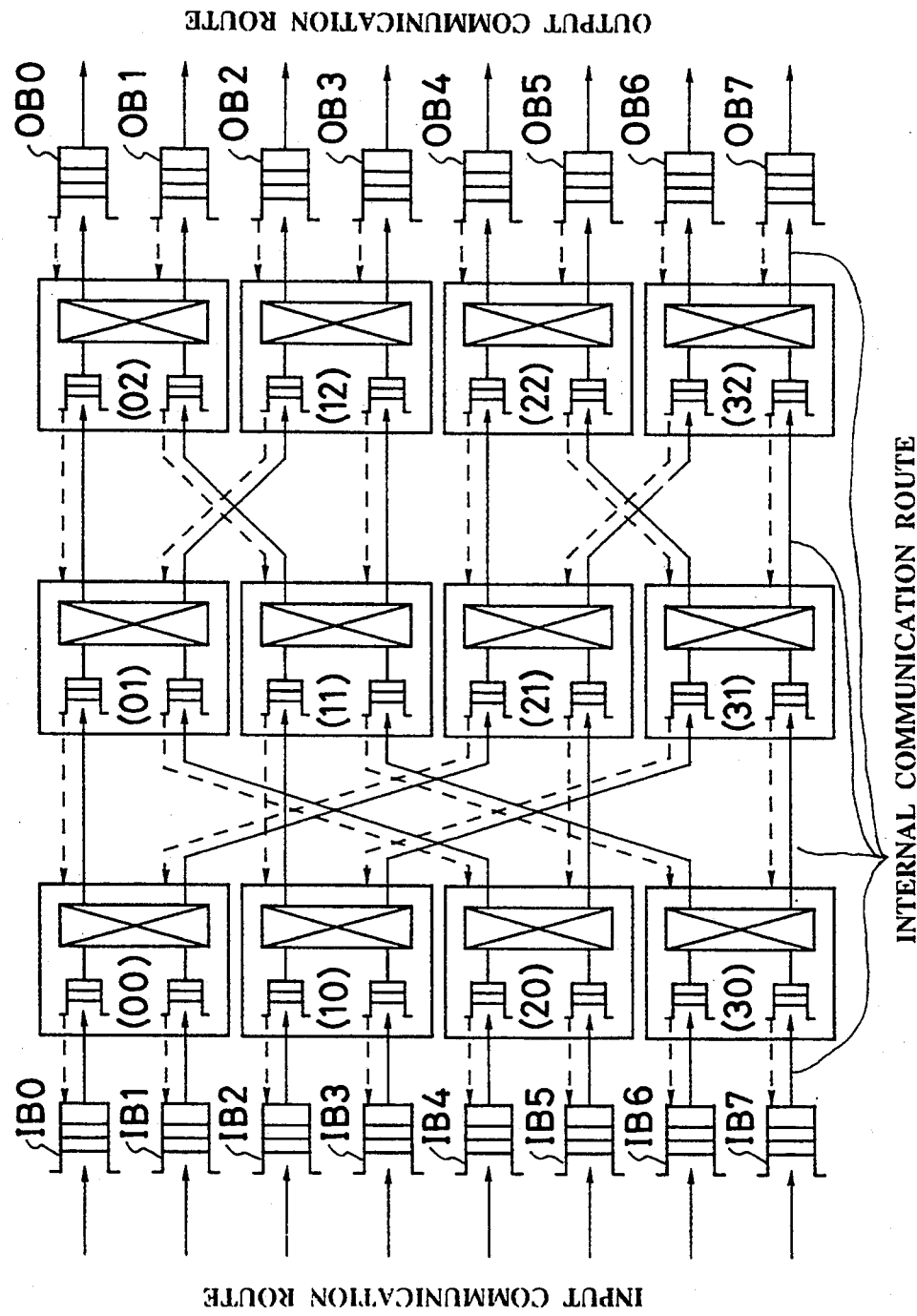
FIG. 9 shows construction of an 8-input-8-output ATM switch as an embodiment of the present invention.

FIG. 9 shows an embodiment of an 8-input-8-output cell switch having the multi-stage routing network construction with buffers according to the present invention. As shown in the same drawing, this cell switch has a network system comprising 12 units of unit switches (00) to (30), (01) to (31) and (02) to (32), input buffers IB0 to IB7 on the input side and output buffers OB0 to OB7 on the output side.

FIG. 10 shows the connection relation of the unit switch (01) to the unit switches (00), (02), (12), and the connection of the same switch (01) to the other unit switches is similarly provided. Incidentally, each unit switch constructing this switch network is able to be operated asynchronously, thereby to transfer cells asynchronously.

The input and output operation of cells by this embodiment is explained with reference to a timing chart shown in FIG. 11. Incidentally, signal names given in the same drawing respectively designate internal signal names of each switch. The following explanation is based on cycle numbers (n−1, n, n+1, ...) of the clock signal S8CK of the unit switch (01). Each internal function block of each unit switch is discriminated by adding the number corresponding to the unit switch. For example, the cell input-side data format conversion means SP A of the unit switch (00) is denoted by SP A(00).

Figure 11B:
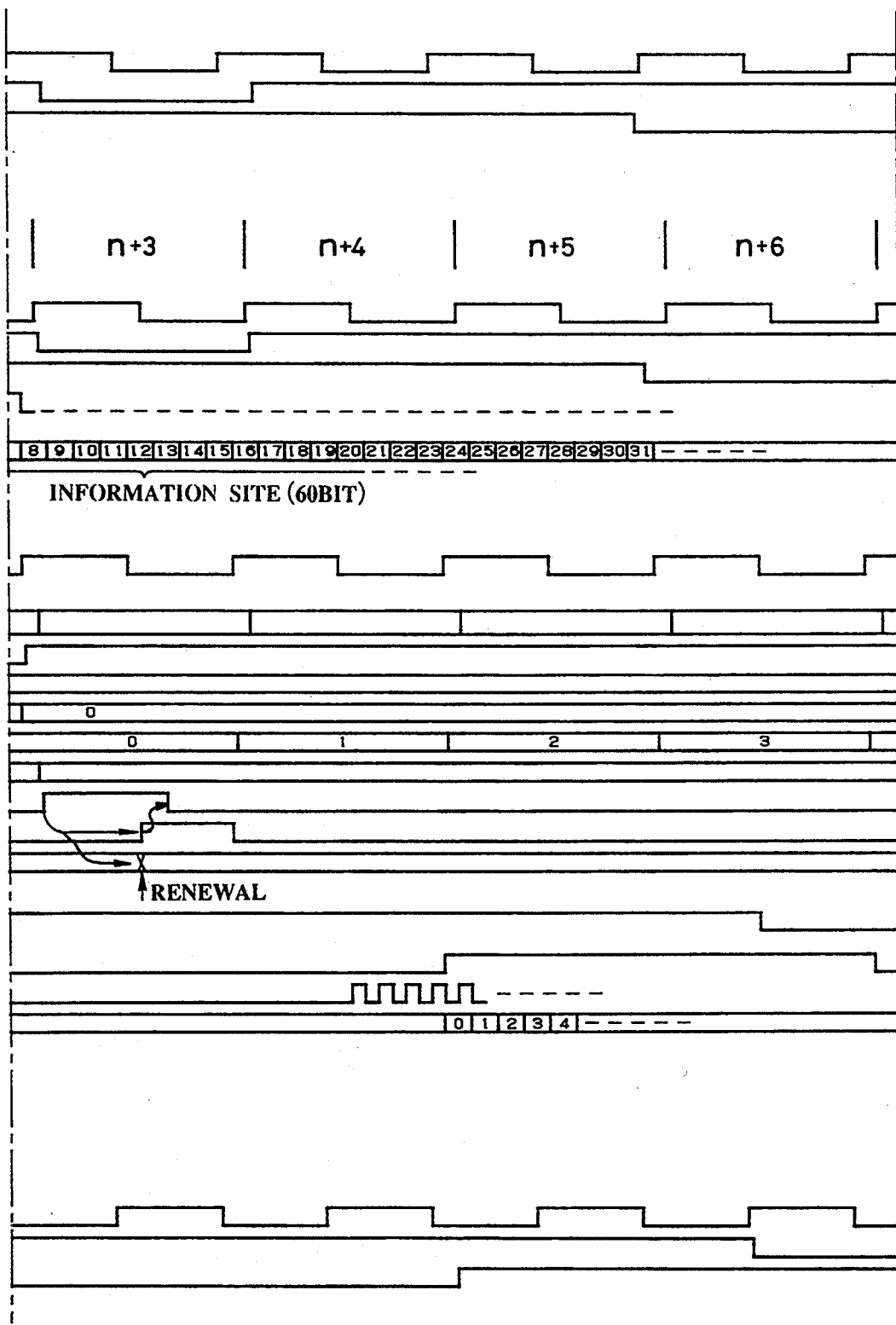
FIG. 11 is a key to the reconstruction of FIGS. 11A–11C which show a timing chart for explaining the operation of the switch shown in FIG. 10.
Figure 11C:
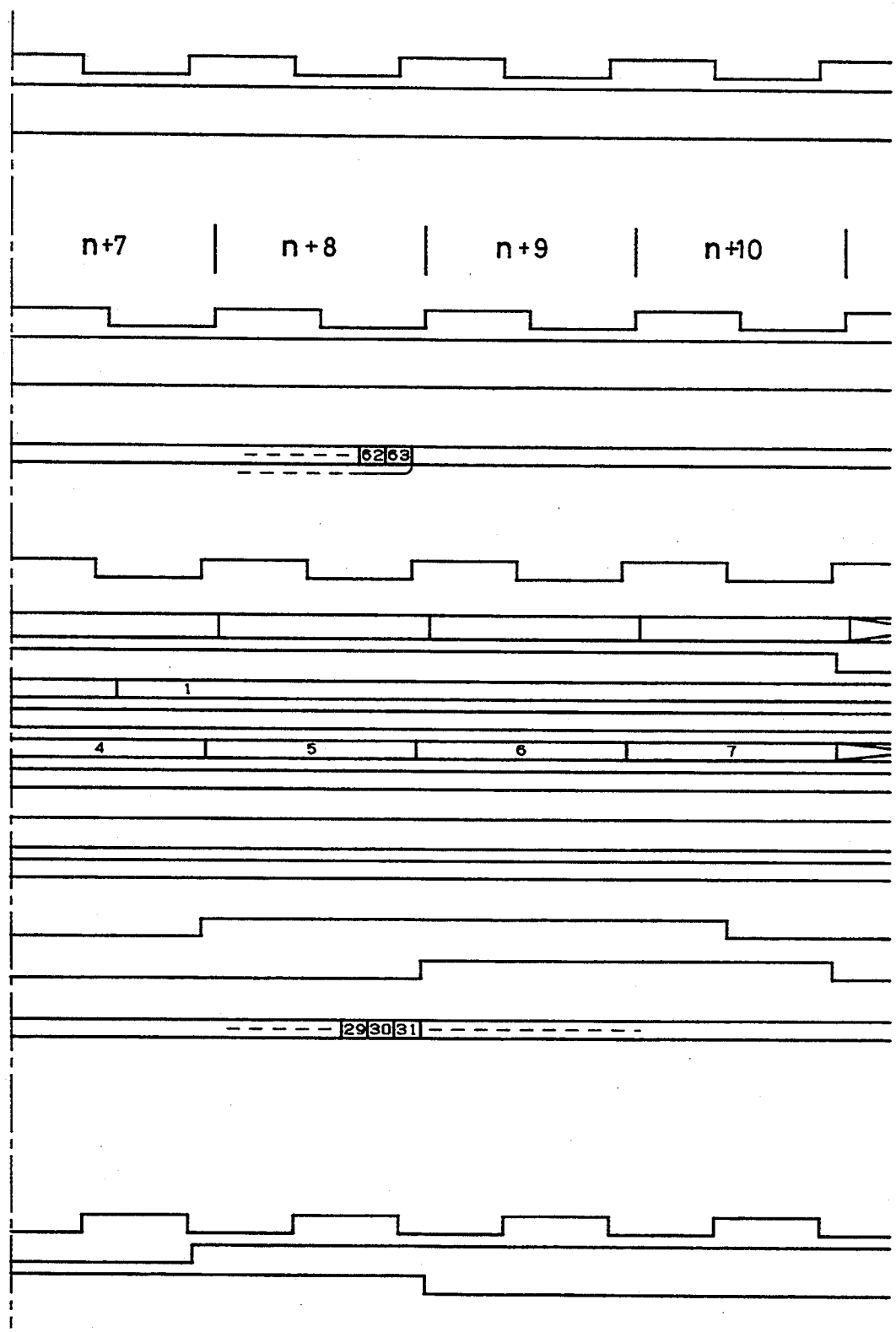

FIG. 11 shows a timing chart of a series of operation in which the unit switch (01) receives a cell from the unit switch (00) on the previous stage, and then transfers the cell to the unit switch (12) on the next stage by the simultaneous cell input-output transfer function. In this case, these unit switches are operated ascronously to one another.

When the cycle number of the clock signal S8CK is n−1, these unit switches are in the following states respectively.

The unit switch (12) has no cells yet, and requires the unit switch (01) to output a cell by controlling the cell input request signal RDYA(12) thereof at 1 (or setting the cell output request signal RDYD(01) at 1).

The unit switch (01) has no cells either, and requires the unit switch (00) to output a cell by adjusting the cell input request signal RDYA(01) at 1 (or RDYU(00) at 1). Incidentally, the unit switch (01) already completes preparation for inputting a cell at the time. For example, the preparation for inputting a cell to the buffer BUF A(01) is carried out in a manner as mentioned below. Namely, to inform the unit switch (00) of a state that the buffer BUF A(01) is capable of receiving cells, the transfer control means TCTR sets the cell input request signal RDYA(01) at 1. In this case, the transfer control means TCTR(01) decides to which address of the buffer BUF A(01) a cell be written, or decides the cell storing address WBA4-3(01), by a predetermined algorithm. Incidentally, the cell storing address 0 is now selected, so that WBA4(01) is set at 1, and WBA3(01) is set at 0.

The unit switch (00) had no cells to be transferred to the output communication route U, but newly receives a cell 0 to be sent to the output communication route U. The cell 0 has such a routing tag as to be sent to the output communication route U in the unit switch (00), but to the output communication route D in the unit switch (01).

In such a state, the cell input operation is executed in the manner explained below.

When the cycle number of the clock signal S8CK is n, the unit switch (00) has a cell outout request signal RDYD(00) of 1, and stores the cell 0 to be transferred to the output communication route U. Therefore, the cell output operation is started.

Next, in the cycle n+1, the unit switch (00) starts to generate the cell output clock BTCKU(00), and then starts to output the cell 0 through the cell output data DATAU(00) in the cycle n+2. Incidentally, the front 4 bits (corresponding to the bit numbers from 0 to 3) is the routing tag region. In this case, a cell output head indication signal STBU(00) is set at 1 at the same time when the head bit (bit number 0) of the cell output data DATAU is outputted.

Moreover, during the cycle n+1, the unit switch (01) starts to generate the cell input clock BTCKA(01), and then starts to input the cell input data DATAA(01) in the cycle n+2. In this case, the cell input head indication signal STBA(01) is set at 1 at the same time when the head bit of the cell input data DATAA(01) is inputted. When the signal STBA(01) becomes 1, the cell input control means ICTR A(01) is started.

Described below are operations executed by the cell input control means ICTR A(01).

(1) The cell write counter WCNT A(01) is started.

(2) The cell storing address WBA4-3 is transferred to the based address register WBA A from the transfer control means TCTR(01).

(3) A write permission signal WENA (01) and the write address WAA4-0(01) are given to the buffer BUF A(01).

(4) Respective control signals are outputted to the cell input-side data format conversion means SP A(01).

(5) The routing tag is outputted to the transfer control means TCTR(01).

During the cycles n+2 to n+9 of the clock signal S8CK, the cell input-side format conversion means SP A(01) of the unit switch (01) converts the cell input data DATAA(01) into 8-bit data, and then output the 8-bit data to the 35 buffer BUF A(01) as write data. Moreover, during the cycles n+3 to n+10, all data of the cell 0 are written in the buffer BUF A(01) through the cell input-side data Format conversion means SP A(01).

Incidentally, in the cycle n+2 of the clock signal S8CK, a 1-bit routing tag TAG1A of the above-mentioned 4 bits is stored in the tag register TAGREG A(01) from the cell input-side data format conversion means SP A(01). Then, in the next cycle n+3, a tag TAG2A held in the tag register TAGREG A(01) is transferred to the buffer information control means BINFO A(01) in the transfer control means TCTR(01). Since the cell input control means ICTR A(01) and the transfer control means TCTR A(01) are respectively operated by different clock signals, the transfer of the signal TAG2A is carried out by a conventional synchronism interrogation process.

Described below are the procedure of the transfer of the signal TAG2A.

(1) The cell input control means ICTR A(01) sets a signal TAGWGOA at 1 after receiving the signal TAG1A in the tag register TAGREG A(01), so as to said information that the signal TAG2A is valid to the transfer control TCTR(01).

(2) The transfer control means TCTR(01) takes the signal TAG2A In the buffer Information means BINF0 A(01) thereof when it receives the signal TAGW-GOA(01) of 1. Thereafter, the means TCTR(01) sets a signal TAGACK(01) at 1 to give information that the signal TAG2A is received therein to the cell Input control means ICTR A(01).

Incidentally, the signal TAG2A is valid until the tag register TAGREG A is rewritten on the next cell input. Therefore, the routing tag transfer can take sufficient time. As the result, even though the above-mentioned synchronism interrogation process must be required, the increase of the cell delay time can be suppressed to a relatively small value.

Moreover, when the cycle number of the clock signal S8CK is n+3. the content of the buffer information control means BINFO A(01) is renewed.

Described below are the procedure of the renewal.

(1) 1 bit selected from the 4 bits in the routing tag of the cell 0 is written in the routing tag information region of a register BREG A0(01). In this case, the routing tag information region is set at 1, so that the cell is to be transferred to the output communication route D.

(2) 1 is written in the flag information region of the register BREG A0(01).

(3) The value of the cell arrival information region of the register BREG A0(01) is incremented.

When the renewal of the register BREG A0(01) is completed at the cycle n+3, and the flag information thereof becomes 1, registration of the cell 0 into the register BREG A0(01) is completed. Thereafter, all data of the cell 0 are recognized to be already inputted to the buffer BUF A(01) In the unit switch (01). (However, actually, these data are still being inputted in the BUF A(01) at the time.)

Next, the cell output operation is explained.

When the cycle number of the clock signal S8CK becomes n+4. the transfer control means TCTR(01) of the unit switch (01) starts the cell output operation in accordance with the information (information that the flag information region of the register BREG A0(01) of the buffer information control means BINF0 A(01) is set at 1) showing that the cell output request signal RDYD(01) is set at 1 and the buffer BUF A(01) stores a cell to be transferred to the output communication route D.

Described below are operations executed in this case by the transfer control means TCTR(01).

(1) A cell to be outputted is decided by a predetermined algorithm. In this case, the cell 0 stored in the buffer BUF A(01) is outputted. Namely, the cell 0 is outputted by the simultaneous cell input-output function. Since the cell 0 Is stored at the cell storing address 00, both read cell storing addresses RBA4(01) and RBA3(01) are set at 1.

(2) A switch signal STCRS1(01) of 1 corresponding to the cross mode is outputted to the cell output control means OCTR(01).

(3) Respective control signals including a start signal are outputted to the cell output control means CTR(01).

Then, the cell output control means 0CTR(01) is started by the control signals given from the transfer control means TCTR(01).

Described below are operations executed by the cell output control means OCTR(01).

(1) A cell read counter RCNT(01) is started.

(2) The cell storing address RBA4-3 to be used for the read operation to the transfer control means TCTR(01) is stored in the buffer read base address register RBA A(01).

(3) A cell output clock BTCKD(01) is generated in the cycle n+4.

(4) In the cycle n+5, a cell output head indication signal STBD(01) is set at 1 at the same time when the head bit of a cell to be outputted from the cell output-side data format conversion means PS D(01) is outputted.

(5) The write permission signal WENA(01) and the write address WAA4-0(01) are outputted to the buffer BUF A(01).

(6) The switch signal STCRS2(01) of 1 is outputted to the cell switch means CRSBSW(01).

(7) Respective control signals including a start signal are outputted to the cell output-side data format conversion means PS D(01).

In such a manner, the cell output-side data format conversion means PS D(01) is started in accordance with the control signals from the cell output control means OCTR(01). Then, the conversion means PS D(01) inputs 8-bit data outputted from the cell switch means CRSBSW(01), converts the data into serial data, and then outputs the serial data from the output communication route D(01).

At the same time, in the cycle n+5, the cell input S clock BTCKA(12) of the unit switch (12) is generated, and the cell 0 is inputted through the cell input data DATAA(12). In this case, the cell input head indication signal STBA (12) becomes 1 at the same time when the head bit of the DATAA(12) is inputted. Thereafter, the same process as mentioned above is carried out in the unit switch (12).

As stated above, each 64-bit cell is processed in the form divided into 8 words respectively consisting of 8 bits by the cell input-side data format conversion means SP, buffer BUF, cell switch means CRSBSW and cell output-side data format conversion means PS, In each unit switch. Moreover, the transfer control means TCTR makes it possible to output a cell inputted in the cell switch before the Input operation of the cell Is completed by grasping the routing tag of the cell Just after the cell input to rapidly recognize the output communication route thereof. As the result, a preferable simultaneous cell input-output function can be realized.

Namely, asynchronous operation or asynchronous cell transfer between the unit switches (00) and (01) can be realized in such a manner. Next, a method of realizing an asynchronous routing network and a method of asynchronizing unit switches included such an asynchronous network are described.

(1) The handshake process between the unit switches (00) and (01) is carried out by the input permission signal RDYA(01) and the cell output head indication signal STBU(00).

(2) The unit switch (00) gives the cell head information to the unit switch (01) by the signal STBU(00).

(3) Moreover, the unit switch (00) gives a cell and the cell output clock signal BTCKU(00) to the unit switch (01).

(4) The cell input control means ICTR A(01) has a divider for dividing the cell input clock signal BTCKA (00).

(5) The cell input control means ICTR A(01), cell input-side data format conversion means SP A, and the hardware for the write operation of buffer BUF A are respectively driven by clock signals belonging to the cell input clock signal BTCKA(00) (or cell output clock signal BTCKU(00)).

(6) The hardware for the read operation of the buffer BUF A, transfer control means TCTR(01), cell switch means CRSBSW(01), cell output control means OCTR(01) and cell output-side data format conversion means PS D(01) are respectively driven by clock signals belonging to the unit switch drive clock signal SYSCK(01). Accordingly, the process of synchronizing the cell input clock signal BTCKA(01) with the unit switch drive clock signal SYSCK(01) is carried out in the buffer BUF A. Such a function of the buffer BUF is schematically shown in FIG. 8.

Next, respective timings to transfer a cell from the unit switch (00) to the unit switch (01) are explained with reference to FIG. 12. The unit switch (00) sends both cell output data DATAU(00) and cell output clock signal BTCKU(00) to the unit switch (01). The signals DATAU(00) and BTCKU(00) are transferred to the unit switch (01) through almost the same transfer routes respectively. Accordingly, the phase relation between the signals BTCKU(00) and DATAA(00) in the unit switch (00) and the phase relation between BTCKU(01) and DATAA(01) in the unit switch (01) are respectively maintained. This means that the timing T(00) is almost the same as T(01) in the same drawing.

As stated above, according to the present invention, since both delay time and clock skew on the transfer route between unit switches can be suppressed, the cell transfer rate Ftrns of the cell switch is decided only by the maximum operation frequency in the hardware such as PS, SP. Therefore, the cell switch with asynchronous routing construction according to the present invention can realize an extremely high cell transfer rate as compared with cell switches with conventional routing networks.

Moreover, according to the present invention, the above-mentioned simultaneous cell input-output transfer function is given to each unit swich for constructing the asynchronous routing network. Therefore, by effectively utilizing this function, it becomes possible to realize a cell switch with extremely small cell delay time.

Moreover, according to the present invention, the simultaneous cell input-output transfer function can accomplish such cell input-output that a cell inputted from the input route is written in each buffer BUF, and is then read out from the buffer BUF in accordance with the cell output request given from the next stage. Therefore, the timing control necessary for the asynchronous routing network becomes easy by controlling the timing when the cell is stored in the buffer BUF. Besides, no special memory means are required for realizing the simultaneous cell input-output transfer function so that the cost can be considerably reduced. In addition, since the transfer control means TCTR controls write and read addresses of the buffer BUF as unitary data, it becomes possible to avoid the collision of these write and read addresses in the buffer BUF on simultaneous cell input-output transfer.

Furthermore, according to the present invention, the unit switches (for example, the clock signals B8CKA(01) and S8CK(01)) are automatically synchronized with one another in each buffer BUF. Therefore, it becomes possible to realize very simple switch construction and avoid troublesome timing control having been necessary for such synchronizing operation. As the result, it becomes possible to provide a cell switch able to realize greatly-reduced cell delay time and markedly-stable operation.

According to the present invention, each unit switch of the cell switch can stop generation of the clock signal and the cell output signal for driving the cell output means included therein when the cell output is not carried out. Therefore, it becomes possible to greatly reduce the power consumption in the cell input-output means of the communication route where the cell transfer is not executed. As the result, the power consumption of the whole network can be also reduced markedly.

Thus, according to the present invention, it becomes possible to provide a cell switch which can realize extremely high cell transfer rate, greatly-reduced cell delay time, stable operation and very small power consumption. Moreover, the cell switch can be realized with very simple hardware.

Various modifications will become possible for those skilled in the art after receiving the teachings of the present disclosure without departing from the scope thereof.

What is claimed is:

1. An ATM communication switch for selectively transferring cells from a plurality of input communication routes to a plurality of output communication routes in accordance with destinations of the respective cells, said ATM communication switch comprising:
   a plurality of input buffers connected with said input communication routes;

a plurality of output buffers connected with said output communication routes;

a plurality of cell switches, each having a clock input port for receiving a clock signal and each capable of receiving cells from two input ports and selectively outputting cells from two output ports, the cell switches being combined in series and parallel with each other between said input and output communication routes via said input and output buffers in order to transfer a cell from any of said input communication routes to any of said output communication routes;

at least one intermediate cell switch being connected between first and second preceding cell switches and first and second subsequent cell switches of said plurality of said cell switches and having a clock input port for receiving a clock signal;

clock generating means for generating clock signals for each of the plurality of cell switches and said at least one intermediate cell switch;

first cell input means, connected, via one of the input ports of the intermediate cell switch, with an output port of the first preceding cell switch, for receiving clock signals supplied to the first preceding cell switch and for receiving a cell from the first preceding cell switch in synchronism with the clock signals supplied to the first preceding cell switch;

second cell input means, connected, via the other of said input ports corresponding to the intermediate cell switch, with an output port corresponding to the second preceding cell switch for receiving clock signals supplied to the second preceding cell switch and for receiving a cell from the second preceding cell switch in synchronism with the clock signals supplied to the second preceding cell switch;

first cell storing means connected with said first cell input means for storing a plurality of cells;

second cell storing means connected with said second cell input means for storing a plurality of cells;

cell transfer control means connected with said first and second cell input means and said first and second cell storing means for transferring cells from said first cell input means to said first cell storing means in synchronism with the clock signals supplied to the first preceding cell and from said second cell input means to said second cell storing means in synchronism with the clock signals supplied to the second preceding cell; and cell output means connected with said first and second cell storing means for outputting cells stored in said first and second cell storing means to the first and second subsequent cell switches in accordance with the destinations of the respective cells in synchronism with the clock signals supplied to the intermediate cell switch.

2. The ATM communication switch recited in claim 1 wherein said first and second cell input means receives the cell from the first and second preceding cell switches respectively via first and second input-side data format conversion means which convert serial data of the cell to corresponding parallel data.

3. The ATM communication switch recited in claim 2 wherein said first and second input-side data format conversion means convert serial data corresponding to the cell to corresponding blocks of parallel data.

4. The ATM communication switch recited in claim 1 wherein said cell switches are coupled in the form of a matrix.

5. In an asynchronous transfer mode (ATM) communication switch for selectively transferring cells from a plurality of input communication routes to a plurality of output communication routes in accordance with destinations given to the respective cells, said ATM communication switch comprising a plurality of input buffers connected with said input communication routes, a plurality of output buffers connected with said output communication routes and a plurality of cell switches each capable of receiving each cell through either of two input ports and selectively outputting cells from either of two output ports, said cell switches being combined in series and parallel with each other between said input and output communication routes via said input and output buffers in order to transfer a cell from any input communication route to any output communication route, said plurality of cell switches, including input cell switches, respectively, connected with said input communication routes via said input buffers, output cell switches respectively connected with said output communication routes via said output buffers and intermediate cell switches located between said input cell switches and said output cell switches, each intermediate cell switch connected between first and second preceding cell switches and first and second subsequent cell switches of said plurality of said cell switches, comprising:

clock generating means for generating a basic clock signal for each of said plurality of cell switches;

first cell input means connected via one of said input ports of said each intermediate cell switch with an output port of the first preceding cell switch for receiving a cell from the first preceding cell switch in synchronism with a first clock signal supplied to the first preceding cell switch;

second cell input means connected via one of said input ports of said each intermediate cell switch with an output port of the second preceding cell switch for receiving a cell from the second preceding cell in synchronism with a second clock signal supplied to the second preceding cell switch;

first cell storing means connected with said first cell input means for receiving and storing the cell from said first cell input means;

second cell storing means connected with said second cell input means for receiving and storing the cell from said second cell input means;

cell transfer control means connected with said first and second cell input means and said first and second cell storing means for controlling a transfer of cells from said first cell input means to said first cell storing means in synchronism with the first clock signal of the first preceding cell and from said second cell input means to said second cell storing means in synchronism with the second clock signal of the second preceding cell; and cell output means connected with said first and second cell storing means for outputting cells stored in said first and second cell storing means to the first and second subsequent cell switches in accordance with the destinations of the respective cells in synchronism with the basic clock signal supplied to each of said intermediate cell switches.

6. The ATM communication switch as claimed in claim 5, wherein said first and second cell input means receive cells from the first and second preceding cell switches respectively via first and second input-side data format conversion means which convert serial data of the cells to corresponding parallel data.

7. The ATM communication switch as claimed in claim 6, wherein said first and second input-side data format conversion means convert serial data of the cells to corresponding parallel data in blocks.

8. The ATM communication switch as claimed in claim 5 wherein said cell switches are coupled in the form of a matrix.

* * * * *